US012384984B2

(12) United States Patent
Nagy et al.

(10) Patent No.: US 12,384,984 B2
(45) Date of Patent: Aug. 12, 2025

(54) PREVENTION OF MCPD FORMATION BY AUXILIARY DEGUMMING

(71) Applicant: SOCIETE DES PRODUITS NESTLE S.A., Vevey (CH)

(72) Inventors: Kornel Nagy, La Tour-de-Peilz (CH); Karine Meisser Redeuil, Pully (CH); Xanthippi Theurillat, Cheseaux-sur-Lausanne (CH); Marine Nicolas, Morges (CH)

(73) Assignee: Societe des Produits Nestle S.A., Vevey (CH)

( * ) Notice: Subject to any disclaimer, the term of this patent is extended or adjusted under 35 U.S.C. 154(b) by 563 days.

(21) Appl. No.: 17/755,986

(22) PCT Filed: Nov. 13, 2020

(86) PCT No.: PCT/EP2020/082073
§ 371 (c)(1),
(2) Date: May 13, 2022

(87) PCT Pub. No.: WO2021/094546
PCT Pub. Date: May 20, 2021

(65) Prior Publication Data

US 2022/0411715 A1 Dec. 29, 2022

(30) Foreign Application Priority Data

Nov. 15, 2019 (EP) .................................... 19209560
Dec. 13, 2019 (EP) .................................... 19216129
(Continued)

(51) Int. Cl.
*C11B 3/16* (2006.01)
*C11B 3/00* (2006.01)

(52) U.S. Cl.
CPC ................ *C11B 3/16* (2013.01); *C11B 3/001* (2013.01); *C11B 3/006* (2013.01)

(58) Field of Classification Search
CPC ............ C11B 3/16; C11B 3/001; C11B 3/006
See application file for complete search history.

(56) References Cited

U.S. PATENT DOCUMENTS 2,260,730 A * 10/1941 Thurman ................ C11B 3/006 554/207
2,881,195 A * 4/1959 Hayes ....................... C11B 3/02 554/190
(Continued)

FOREIGN PATENT DOCUMENTS

CN 103442580 A 12/2013
CN 103458699 A 12/2013
(Continued)

OTHER PUBLICATIONS

Matthause et al., Strategies for the reduction of 3-MCPD esters and related compounds in vegetable oils, Eur. J. Lipid Sci. Technol, vol. 113, pp. 380-386 (Year: 2011).*
(Continued)

*Primary Examiner* — Yate' K Cutliff
(74) *Attorney, Agent, or Firm* — K&L Gates LLP

(57) ABSTRACT

A method is provided for preventing or reducing the formation of monochloropropanediols (MCPDs) or monochloropropanediol esters (MCPDEs) in triacylglyceride oil, comprising the steps: (a) admixing the triacylglyceride oil with (1) an auxiliary oil wherein the auxiliary triacylglyceride oil has higher phospholipid and/or wax content than the triacylglyceride oil; and/or (2) the gum extract from an oil; (b) degumming the triacylglyceride oil admixture and/or optionally allowing the insoluble components to crystallize; (c) optionally concentrating the insoluble and crystallized components from the triacylglyceride oil admixture (1) by
(Continued)

applying a centrifugational force on the triacylglyceride oil admix and/or (2) by allowing the insoluble and crystallized components to settle by gravity; (d) separating insoluble and crystallized components from the triacylglyceride oil admixture and/or optionally applying one or more processes selected from degumming, physical refining, chemical refining, neutralization, interesterification, bleaching, dewaxing and fractionation; (e) applying heat treatment to the triacylglyceride oil admixture.

16 Claims, 16 Drawing Sheets

(30) Foreign Application Priority Data

May 4, 2020 (EP) ..................................... 20172666
Aug. 25, 2020 (EP) ..................................... 20192753

(56) References Cited

U.S. PATENT DOCUMENTS

2014/0018559 A1* 1/2014 Nagy ........................ A23D 9/02
554/21
2017/0042174 A1* 2/2017 Brüse ........................ A23L 5/21

FOREIGN PATENT DOCUMENTS

| | | | | | |
|---|---|---|---|---|---|
| CN | 103525548 | A | | 1/2014 | |
| CN | 106281672 | A | | 1/2017 | |
| CN | 110024870 | A | | 7/2019 | |
| JP | S5335709 | A | | 4/1978 | |
| WO | 2010063450 | | | 6/2010 | |
| WO | WO2011/002275 | | * | 1/2011 | |
| WO | WO-2011009843 | A1 | * | 1/2011 | ............... C11B 3/00 |
| WO | 2019175258 | | | 9/2019 | |

OTHER PUBLICATIONS

Chinese Office Action for Appl No. 202080078802.8 dated Jul. 27, 2023.
Matthaus et al. "Mitigation of 3-MCPD and glycidyl esters within the production chain of vegetable oils especially palm oil" Lipid Technology, Jul. 2013, vol. 25, No. 7, pp. 151-155.
Japanese Office Action for Application No. 2022-528037 dated Mar. 11, 2025, 5 pages.

* cited by examiner

PREVENTION OF MCPD FORMATION BY AUXILIARY DEGUMMING

CROSS REFERENCE TO RELATED APPLICATIONS

The present application is a National Stage of International Application No. PCT/EP2020/082073, filed on Nov. 13, 2020. which claims priority to European Patent Application No. 19209560.2, filed on Nov. 15, 2019, European Patent Application No. 19216129.7, filed on Dec. 13, 2019, European Patent Application No. 20172666.8, filed on May 4, 2020, and European Patent Application No. 20192753.0, filed on Aug. 25, 2020, the entire contents of which are being incorporated herein by reference.

FIELD OF THE INVENTION

The present invention relates to the purification of oils. In particular, the invention relates to the improved degumming and mechanical purification of triacylglyceride oil to reduce or completely remove monochloropropandiol esters (MCPDEs) from refined oil.

BACKGROUND TO THE INVENTION

3-Halogen-1,2-propandiols, in particular 3-monochloro-1,2-propandiol (3-MCPD), are known contaminants in foods (Food Addit. Contam. (2006) 23: 1290-1298). For example, studies have indicated that 3-MCPD may be carcinogenic to rats if administered at high doses (Evaluation of Certain Food Additives and Contaminants, World Health Organisation, Geneva, Switzerland (1993) 267-285; Int. J. Toxicol. (1998) 17: 47). 3-MCPD was originally found in acid-hydrolysed vegetable protein (acid-HVP; Z. Lebensm.-Unters. Forsch. (1978) 167: 241-244). More recently, it was found that refined edible oils may contain 3-MCPD in its fatty acid ester form, but only very little amounts of free 3-MCPD (Food Addit. Contam. (2006) 23: 1290-1298). The European Food Safety Authority (EFSA) has recommended that 3-MCPD esters are treated as equivalent to free 3-MCPD in terms of toxicity (European Food Safety Authority (2008)).

It has been reported that chlorination of acylglycerides can occur at very high temperatures, for example during the final step of the oil refining process, or deodorisation, under which oils may be heated under vacuum (3-7 mbar) up to 260-270° C. This may result in the formation of fatty acid esters of MCPD.

Effective mitigation routes for MCPD esters are limited and pose a challenge to the plant oil refining industry. Currently, the presence of 3-MCPD in refined oils is carefully monitored and oils with 3-MCPD content above a threshold value are discarded in order to ensure full compliance with EFSA recommendations.

As 3-MCPD may occur in many refined commercially important oils, such as plant oils, there exists a significant need for improved methods for removing and/or avoiding the production of such contaminants during oil refining.

SUMMARY OF THE INVENTION

The inventors have developed a method by which MCPDs and MCPD esters (MCPDE including monoesters and diesters) formation during the process of oil refining can be substantially reduced or prevented.

The principle of the method is that a combined purification process with the purifying action of phospholipid and wax components present in certain crude oils, could be used to purify those oils that lack phospholipids and/or waxes (e.g. palm). This way the method takes advantage of the high phospholipid- and/or wax-content of crude oils or their gum extract to improve the purification of another, low-phospholipid oil.

As a result, the insoluble and water soluble chlorine or chloride containing substances, which potentially serve as a chlorine source, are enriched in the aqueous and sedimented fraction of the oil and can be thus separated from the oil to be refined. The separation can occur via mechanical treatment such as centrifugation, settling, filtration or conventional degumming or other refining processes. The method of the invention can be applied to crude or partially refined (e.g. centrifuged, degummed or bleached) triacylglycerol (also called triacylglyceride) oil which include but are not limited to palm oil, palm stearin, palm olein and their various fractions, palm kernel oil, coconut oil, sunflower oil, high oleic sunflower oil and their variants, canola/rapeseed oil, corn oil, soybean oil, fish oil, algae oil, oil obtained from yeast, oil obtained from fungi, cocoa butter and any mixtures or blends thereof.

The mechanical treatment can include centrifugation and/or settling either before, in between or after any other purification, refining or deodorization step.

The degumming step can include water degumming, acid degumming, combination thereof, dry degumming, base degumming, chemical refining, or combination thereof.

Once removed, the potential sources of chlorine are no longer available for the formation of chlorinated compounds, such as MCPDs, MCPD mono-esters and MCPD di-esters during the heating steps in oil refinement. Product oils low in chlorine carrying substances are thereby obtained and the purified oils may be subjected to various refining practices, such as heat treatment and deodorisation, in order to produce refined oils with reduced or no MCPDs and MCPDEs.

Further benefit of the method of the invention is that it enables lower temperatures to be used in deodorisation of the oil, which both 1) reduces trans-fatty acid formation (trans fat formation at high temperature is reviewed in Baley's industrial oil and fat products; Sixth Edition; Volume 5 Edible Oil and Fat Products: Processing Technologies; Chapter 8 Deodorization; section 3. Refined oil quality, subsection 3.2 Fat isomerization and degradation products).
2) reduces formation of glycidyl esters (see the summary of the elimination methods of GEs in "Glycidyl fatty acid esters in refined edible oils: a review on formation, occurrence, analysis, and elimination methods" in Comprehensive Reviews in Food Science and Food Safety; vol. 16, 263-281; 2017).

Accordingly, in one aspect the invention provides a method for preventing or reducing the formation of monochloropropanediols (MCPDs) or monochloropropanediol esters (MCPDEs) in triacylglyceride oil, comprising the steps:

(a) admixing the triacylglyceride oil with
   1. an auxiliary oil wherein the auxiliary oil has higher phospholipid and/or wax content than the triacylglyceride oil; and/or
   2. the gum extract from an oil;
(b) degumming the triacylglyceride oil admixture and/or optionally allowing the insoluble components to crystallize (c) optionally concentrating the insoluble and crystallized components from the triacylglyceride oil admixture
1. by applying a centrifugational force on the triacylglyceride oil admix and/or
2. by allowing the insoluble and crystallized components to settle by gravity;
(d) separating insoluble and crystallized components from the triacylglyceride oil admixture and/or optionally applying one or more processes selected from degumming, physical refining, chemical refining, neutralization, interesterification, bleaching, dewaxing and fractionation.
(e) applying heat treatment to the triacylglyceride oil admixture.

In some embodiments, the starting triacylglyceride oil is a plant oil, animal oil, fish oil, yeast oil, fungi or algal oil, preferably a plant oil. The starting triacylglyceride oil refers to the triacylglyceride oil before it is admixed in step (a) of the method.

In some embodiments, the starting triacylglyceride oil is palm oil or fractions obtained from palm oil.

In some embodiments, the starting triacylglyceride oil is fish oil or fractions obtained from fish oil.

In some embodiments, the starting triacylglyceride oil is a crude oil.

In some embodiments, the starting triacylglyceride oil is a partially refined oil or oil mixture that has been purified either by centrifugation, settling, filtration, washing, dewaxing, fractionation, degumming, bleaching, or deodorization, or any combination of these.

In one embodiment, starting triacylglyceride oil has been water degummed without the use of an acid. The acid may be phosphoric acid, citric acid, sulphuric acid, formic acid, or acetic acid.

In some embodiments, the starting triacylglyceride oil is a mixture of crude and partially refined oils.

In one embodiment, the starting triacylglyceride oil has been bleached.

In one embodiment, the starting triacylglyceride oil has been contacted with bleaching earth.

In one embodiment, the starting triacylglyceride oil has been mixed with bleaching earth.

In one embodiment, the starting triacylglyceride oil has been bleached with at least 0.01% (w/w), preferably at least 0.1% (w/w), more preferably at least 0.5% (w/w) bleaching earth.

In one embodiment, the starting triacylglyceride oil has been in contact with at least 0.01% (w/w), preferably at least 0.1% (w/w), more preferably at least 0.5% (w/w) bleaching earth.

In one embodiment, the starting triacylglyceride oil has been mixed with at least 0.01% (w/w), preferably at least 0.1% (w/w), more preferably at least 0.5% (w/w) bleaching earth.

In one embodiment, the starting triacylglyceride oil has been mixed with bleaching earth and the bleaching earth has been removed from the oil.

In one embodiment, the starting triacylglyceride oil has been mixed with bleaching earth and the bleaching earth is not removed from the oil before step a).

In one embodiment, the admixing of step (a) comprises heating to a temperature greater than the melting temperatures of the starting triacylglyceride oil and the auxiliary oil, and/or homogenising the mixture.

In one embodiment, the admixing of step (a) comprises incubating the starting triacylglyceride oil and auxiliary oil at a temperature greater than the melting temperatures of the starting triacylglyceride oil and the auxiliary oil, and/or homogenising the mixture.

In one embodiment, the admixing of step (a) comprises heating to a temperature greater than the melting temperatures of the starting triacylglyceride oil and the gum extract from an oil, and/or homogenising the mixture.

In one embodiment, the gum extract of an oil is heated to a temperature above 100° C. or 120° C. or 140° C. or 160° C. or 180° C. or 200° C. before the admixing step (a).

In one embodiment, the auxiliary oil is heated to a temperature above 100° C. or 120° C. or 140° C. or 160° C. or 180° C. or 200° C. before the admixing step (a).

In one embodiment, the admixture of step (a) is heated to a temperature above 100° C. or 120° C. or 140° C. or 160° C. or 180° C. or 200° C. before step (b).

In one embodiment, the gum extract of an oil, or the auxiliary oil, or the admixture of step a) is incubated for at least 1 minute.

In one embodiment, the admixture of step (a) is heated in a closed vessel under a pressure higher than 1 bar or 3 bars or 5 bars before step (b).

In one embodiment, the admixture is cooled down to 20° C., or 10° C., or 5° C., or 4° C., or 0° C. or sub-zero temperatures in step (b) in order to accelerate the crystallization process and precipitation of insoluble components.

In one embodiment, the gum extract of the oil is devoid of any added acid.

In another embodiment, the degumming process of step (b) is performed with addition of water that is devoid of any added acid, without adding any acid to the oil.

In one embodiment, the gum extract of the oil is fractionated before use.

In another embodiment, the gum extract of the oil is purified before use.

In one embodiment, the admixing of step (a) comprises incubating the starting triacylglyceride oil and the gum extract obtained from an oil at a temperature greater than the melting temperatures of the starting triacylglyceride oil and the gum, and/or homogenising the mixture.

In one embodiment, the temperature of admixture of step (a) is adjusted to a temperature of at least 10° C. above the melting point of the starting triacylglyceride oil, or to a temperature of at least 10° C. above the melting point of the auxiliary oil, whichever is the highest wherein the temperature is preferably adjusted from step (a) until step (d).

In one embodiment, the temperature of admixture of step (a) is adjusted to a temperature of at least 20° C. above the melting point of the starting triacylglyceride oil, or to a temperature of at least 20° C. above the melting point of the auxiliary oil, whichever is the highest wherein the temperature is preferably adjusted from step (a) until step (d).

In one embodiment, the temperature of admixture of step (a) is adjusted to a temperature of at least 30° C. above the melting point of the starting triacylglyceride oil, or to a temperature of at least 30° C. above the melting point of the auxiliary oil, whichever is the highest wherein the temperature is preferably adjusted from step (a) until step (d).

In one embodiment, the temperature of admixture of step (d) is adjusted to a temperature of at least 10° C. above the melting point of the starting triacylglyceride oil, or to a temperature of at least 10° C. above the melting point of the auxiliary oil, whichever is the highest.

In one embodiment, the temperature of admixture of step (d) is adjusted to a temperature of at least 20° C. above the melting point of the starting triacylglyceride oil, or to a temperature of at least 20° C. above the melting point of the auxiliary oil, whichever is the highest.

In one embodiment, the temperature of admixture of step (d) is adjusted to a temperature of at least 30° C. above the melting point of the starting triacylglyceride oil, or to a temperature of at least 30° C. above the melting point of the auxiliary oil, whichever is the highest.

In some embodiments, the insoluble and crystallized components are separated from the triacylglyceride oil admixture by one or more of filtration, decantation, centrifugation, pumping, and draining.

In some embodiments, the gum extract of the oil is obtained by one or more of sedimentation, crystallization and settling, and centrifugation.

In some embodiments, the gum extract of the oil is obtained by one or more of water degumming, and acid degumming.

In some embodiments, the gum extract of the oil is obtained by water-acid degumming.

In some embodiments, the gum extract of the oil is obtained by water degumming using water that is devoid of any added acids.

In some embodiments, the gum extract of the oil is obtained by one or more of water degumming, acid degumming, acid degumming, water-acid degumming, super degumming, TOP degumming, UF degumming, organic refining, dry degumming, caustic refining, sedimentation, crystallization and settling, and centrifugation.

In some embodiments, the insoluble components comprise for example microparticles, segregated droplets, emulsions, suspensions and sediments.

In another embodiment, the heat treatment is deodorization, for example by steam distillation or short path distillation.

In another embodiment, the heat treatment occurs in a closed vessel.

In one embodiment, the heat treatment step removes unwanted components. These can be color pigments, free fatty acids, monoglycerides, trace contaminants and/or odours.

In one embodiment, the invention provides a method for preventing or reducing the formation of monochloropropanediols (MCPDs).

In one embodiment, the invention provides a method for preventing or reducing the formation of monochloropropanediol esters (MCPDEs).

In one embodiment, step (a 2) is performed and then step (a 1) is performed.

In one embodiment, step (a 1) is performed and then step (a 2) is performed.

In one embodiment, applying heat treatment comprises exposing the oil to temperatures in the 150-300° C. range, more preferably in the 160-290° C. or in the 160-240° C. range preferably at least for 30 minutes.

In one embodiment, applying heat treatment comprises exposing the oil to temperatures in the 140-200° C. range.

In one embodiment, the starting triacylglyceride oil is palm oil. In one embodiment, the starting triacylglyceride oil is palm oil and the heat treatment step comprises exposing the oil to temperatures in the range 160-290° C.

In one embodiment, the starting triacylglyceride oil is fish oil. In one embodiment, the starting triacylglyceride oil is fish oil and the heat treatment step comprises exposing the oil to temperatures in the range 140-220° C.

In one embodiment, the starting triacylglyceride oil is sunflower oil and the heat treatment step comprises exposing the oil to temperatures in the range 160-240° C.

In one embodiment, the quantity of the monochloropropandiols (MCPDs) or monochloropropandiol esters (MCPDEs) is measured after the heat treatment step (e).

In one embodiment, the quantity of the monochloropropanediols (MCPDs) or monochloropropandiol esters (MCPDEs) is measured after the heat treatment step (e), and wherein the quantity of the monochloropropanediols (MCPDs) or monochloropropandiol esters (MCPDEs) is reduced by at least 30% when compared to the heat treated oil purified using the same protocol but without the auxiliary oil or gum extract.

In one embodiment, the quantity of the MCPDEs in the heat treated oil of step (e) is reduced by at least a factor of two as measured by direct LC-MS.

In one embodiment, the starting triacylglyceride oil of step (a) is a crude triacylglyceride oil.

In one embodiment, the starting triacylglyceride oil has not been degummed before step (a) In one embodiment, the starting triacylglyceride oil has been degummed before step (a).

In one embodiment, the starting triacylglyceride oil has not been bleached before step (a). In one embodiment, the starting triacylglyceride oil has not been fractionated before step (a).

In one embodiment, the starting triacylglyceride oil has been degummed before step (a). In one embodiment, the starting triacylglyceride oil has been bleached before step (a). In one embodiment, the starting triacylglyceride oil has been fractionated before step (a).

In one embodiment, the starting triacylglyceride oil has been neutralized before step (a).

In one embodiment, the starting triacylglyceride oil has not been neutralized before step (a). In a preferred embodiment, the starting triacylglyceride oil has not been deodorised before step (a).

In one embodiment, the starting triacylglyceride oil is subjected to preliminary cleaning before step (a). In one embodiment, the starting triacylglyceride oil is subjected to preliminary refining before step (a). In one embodiment, the starting triacylglyceride oil is subjected to hydrogenation before step (a). In one embodiment, the starting triacylglyceride oil is subjected to interesterification before step (a).

In one embodiment, the starting triacylglyceride oil is a plant oil, animal oil, fish oil or algal oil.

In one embodiment, the starting triacylglyceride oil is crude palm oil and wherein the method starting with step (a) is applied.

In one embodiment, the starting triacylglyceride oil is a fractionated crude palm oil and wherein the method starting with step (a) is applied.

In one embodiment, the starting triacylglyceride oil is a crude palm kernel oil and wherein the method starting with step (a) is applied.

In one embodiment, the starting triacylglyceride oil is a fractionated crude palm kernel oil and wherein the method starting with step (a) is applied.

In one embodiment, the starting triacylglyceride oil is a crude coconut oil and wherein the method starting with step (a) is applied.

In one embodiment, the starting triacylglyceride oil is a fractionated crude coconut oil and wherein the method starting with step (a) is applied.

In one embodiment, the starting triacylglyceride oil is an oil obtained from algae, or yeast or fungi and wherein the method starting with step (a) is applied.

In one embodiment the starting triacylglyceride oil is crude fish oil.

In one embodiment the starting triacylglyceride oil is crude algae oil.

In one embodiment the starting triacylglyceride oil is crude fungi oil.

In one embodiment the starting triacylglyceride oil is crude yeast oil.

In one embodiment, the starting triacylglyceride oil is a crude seed oil and wherein the method starting with step (a) is applied. For example, the crude seed oil may be sunflower oil, canola/rapeseed oil, corn oil.

In a preferred embodiment, the starting triacylglyceride oil is a plant oil, preferably wherein the plant oil is selected from the group consisting of palm oil, sunflower oil, corn oil, canola oil, soybean oil, corn oil, coconut oil, palm kernel oil and cocoa butter. In one embodiment, the starting triacylglyceride oil is palm oil.

In one embodiment, the auxiliary oil is crude sunflower oil or its high oleic variants.

In one embodiment, the auxiliary oil is crude soybean oil or its high oleic variants.

In one embodiment, the auxiliary oil is crude rapeseed oil or its high oleic variants.

In one embodiment, the gum extract is obtained from crude rapeseed oil or its high oleic variants.

In one embodiment, the gum extract is obtained from crude soybean oil or its high oleic variants.

In one embodiment, the gum extract is obtained from crude sunflower oil or its high oleic variants.

In one embodiment, the auxiliary oil develops 10 times less, or 3 times less or 2 times less MCPD upon heating than the starting triacylglyceride oil.

In one embodiment, the heat treated auxiliary oil develops less than 10 ppm, or less than 3 ppm or less than 1 ppm or less than 0.5 or less than 0.2 ppm MCPD. In one embodiment, the starting triacylglyceride oil has a free fatty acid content of between 0.5-25% (w/w %), or a free fatty acid content of between 1-12% (w/w %), or a free fatty acid content of between 3-7% (w/w %).

In another embodiment, the starting triacylglyceride oil has a free fatty acid content at least 0.5 (w/w %), preferably 1 (w/w %), more preferably 3% (w/w %). In another embodiment, the starting triacylglyceride oil has a free fatty acid content of less than 25 (w/w %), preferably less than 15 (w/w %), more preferably less than 10% (w/w %).

In one embodiment, the starting triacylglyceride oil has not been admixed with any alkali such as sodium hydroxide or potassium hydroxide or any product comprising sodium hydroxide, or potassium hydroxide for example caustic soda, caustic potash. In another embodiment, the starting triacylglyceride oil has not been admixed with any ammonium hydroxide or any ammonium salt.

In one embodiment the starting triacylglyceride oil has not been admixed with a salt for example sodium salts, potassium salts, ammonium salts. Examples of sodium salts include sodium chloride, sodium hypochlorite, sodium carbonate, sodium formate, sodium citrate, sodium phosphate.

In another embodiment, the starting triacylglyceride oil has a soap content of less than 1000 ppm. In another embodiment, the starting triacylglyceride oil has a soap content of less than 20 ppm. In another embodiment, the starting triacylglyceride oil is devoid of soap.

In one embodiment the starting triacylglyceride oil has not been acidified or subjected to acid degumming.

In another embodiment, the starting triacylglyceride oil has not been admixed with an acid smaller than 195 Da. In a preferred embodiment, the starting triacylglyceride oil has not been admixed with an acid having its anhydrous form smaller than 195 Da.

In another embodiment, the starting triacylglyceride oil is devoid of acids smaller than 195 Da in a quantity greater than 0.01%. In another embodiment, the starting triacylglyceride oil is devoid of acids having an anhydrous form smaller than 195 Da in a quantity greater than 0.01%.

In another embodiment, the starting triacylglyceride oil does not comprise an acid that has a log $P<1$ in a quantity greater than 0.01%. In another embodiment, the starting triacylglyceride oil does not comprise an acid that has an acidity $pKa1<5$ in a quantity greater than 0.01%.

In another embodiment, the starting triacylglyceride oil is substantially devoid of any one of phosphoric acid, citric acid, sodium hydroxide, potassium hydroxide, boric acid, hypochloric acid and hydrochloric acid. As used herein, sodium hydroxide can mean caustic soda or alkaline, and potassium hydroxide can mean alkali potash.

In another embodiment, the starting triacylglyceride oil is substantially devoid of any one of phosphoric acid, citric acid, sodium chloride, sodium carbonate, sodium hydroxide, potassium hydroxide, phosphates, polyphosphates, acetic acid, acetic anhydride, calcium sulfate, calcium carbonate, sodium sulfate, boric acid, hypochloric acid, hydrochloric acid, and tannic acid.

In another embodiment, the starting triacylglyceride oil is substantially devoid of any added ionic, cationic and anionic surfactants. In another embodiment, the starting triacylglyceride oil is substantially devoid of any emulsifiers such as sorbitan esters or polyglycerol esters.

In another embodiment, the starting triacylglyceride oil is substantially devoid of any additive as listed in Bailey's Industrial Oil and Fat Products—6th edition, page 2236 in Chapter Emulsifiers for the food industry—Table 4, page 262], for example sucrose, glycol, propylene glycol and/or lactylates.

In one embodiment, the starting triacylglyceride oil has not been subjected to water degumming or wet degumming.

In another embodiment, the starting triacylglyceride oil has a water content of less than 1%, or less than 0.5%, or less than 0.3%, In one embodiment, the starting triacylglyceride oil has a moisture content of less than 1%, or less than 0.3%, or less than 0.1%.

In one embodiment the starting triacylglyceride oil is neutralized fish oil.

In one embodiment the starting triacylglyceride oil is neutralized algae oil.

In one embodiment the starting triacylglyceride oil is neutralized fungi oil.

In one embodiment the starting triacylglyceride oil is neutralized yeast oil.

In a preferred embodiment, the starting triacylglyceride oil has not been admixed with any water, and has a moisture content of less than 0.5%.

In another embodiment, the starting triacylglyceride oil is devoid of added water.

In one embodiment, the starting triacylglyceride oil has a bleaching clay content of less than 0.01%. In another embodiment, the starting triacylglyceride oil has not been admixed with bleaching clay. In another embodiment, the starting triacylglyceride oil is devoid of bleaching clay.

In one embodiment, the starting triacylglyceride oil has not been bleached. In another embodiment, the starting triacylglyceride oil has not been degummed. In another embodiment, the starting triacylglyceride oil has not been neutralized.

In another embodiment, the starting triacylglyceride oil is devoid of added crystallization agents, for example solvents. Such solvents may include hexane, acetone and detergents described in [The Lipid Handbook—Third Edition; edited by Frank D. Gunstone; Chapter 4.4.2.] and in [Bailey's Industrial Oil and Fat Products—6th edition, Chapter 12] or sorbitan esters or polyglycerol fatty acid esters as described in [Omar et al Journal of Oil Palm Research Vol. 27 (2) June 2015 p. 97-106]. The starting triacylglyceride oil may be a crude palm oil.

In another embodiment, the starting triacylglyceride oil has not been dewaxed.

In another embodiment, the starting triacylglyceride oil is devoid of added substances, for example degumming agents, neutralization agents, additives, solvents, salts, seeding agents, acids, bases or buffers.

In another embodiment, the starting triacylglyceride oil is a crude palm oil and is devoid of added substances, for example degumming agents, neutralization agents, additives, solvents, salts, seeding agents, acids, bases or buffers.

In one embodiment, the degumming step (b) uses any one of phosphoric acid, citric acid, sodium chloride, sodium carbonate, sodium hydroxide, potassium hydroxide, phosphates, polyphosphates, acetic acid, acetic anhydride, calcium sulfate, calcium carbonate, sodium sulfate, boric acid, hypochloric acid, hydrochloric acid, and tannic acid.

In one embodiment, the degumming step (b) uses water.

In one embodiment, the degumming step (b) uses water in combination with any one of phosphoric acid, citric acid, sodium chloride, sodium carbonate, sodium hydroxide, potassium hydroxide, phosphates, polyphosphates, acetic acid, acetic anhydride, calcium sulfate, calcium carbonate, sodium sulfate, boric acid, hypochloric acid, hydrochloric acid, and tannic acid.

In one embodiment, the starting triacylglyceride oil is pre-purified from insoluble materials by centrifugation.

In one embodiment, the starting triacylglyceride oil has a crystallized triacylglycerol content less than 10% (w/w %). In another embodiment, the starting triacylglyceride oil has a crystallized triacylglycerol content less than 5% (w/w %). In one embodiment, the starting triacylglyceride oil has a crystallized triacylglycerol content less than 2% (w/w %). In one embodiment, the starting triacylglyceride oil has a crystallized triacylglycerol content less than 0.5% (w/w %).

As used herein, crystallized triacylglycerols refer to solid state triacylglycerols or the solid part of fats. The solid fat content of fats & oils can be determined by pulsed Nuclear Magnetic Resonance [Bailey's Industrial Oil and Fat Products—6th edition, page 175 Chapter 5.2.1.]

In another embodiment, the starting triacylglyceride oil has not been cooled below 20° C., 15° C. or 10° C.

In one embodiment, the method further comprises one or more of the following steps subsequent to step (e):

(f) one or more processes selected from the group consisting of physical or chemical refining, degumming, neutralization and bleaching;
(g) optionally deodorising the product of step (f), preferably wherein the deodorising is vacuum steam deodorising; and
(h) optionally fractionating the product of step (f) and (g).

In another aspect, there is provided a purified triacylglyceride oil obtainable by the method of the invention.

In one embodiment the quantity of the monochloropropandiol esters (MCPDEs) in the heat treated purified oil is reduced by a factor of two compared to the heat treated oil purified via the same protocol but without the auxiliary oil or its gum.

In one embodiment the quantity of the monochloropropanediol esters (MCPDEs) in the heat treated purified oil is lower by at least 30% compared to the heat treated oil purified via the same protocol but without the auxiliary oil or its gum.

In one embodiment the quantity of the monochloropropanediol esters (MCPDEs) in the heat treated purified oil is lower by at least 50% compared to the heat treated oil purified via the same protocol but without the auxiliary oil or its gum.

There is also provided a purified triacylglyceride oil according to the invention, for use in the production of a food product.

There is also provided a food product, produced by using a purified triacylglyceride oil according to the invention.

DETAILED DESCRIPTION OF THE INVENTION

Figure 1:
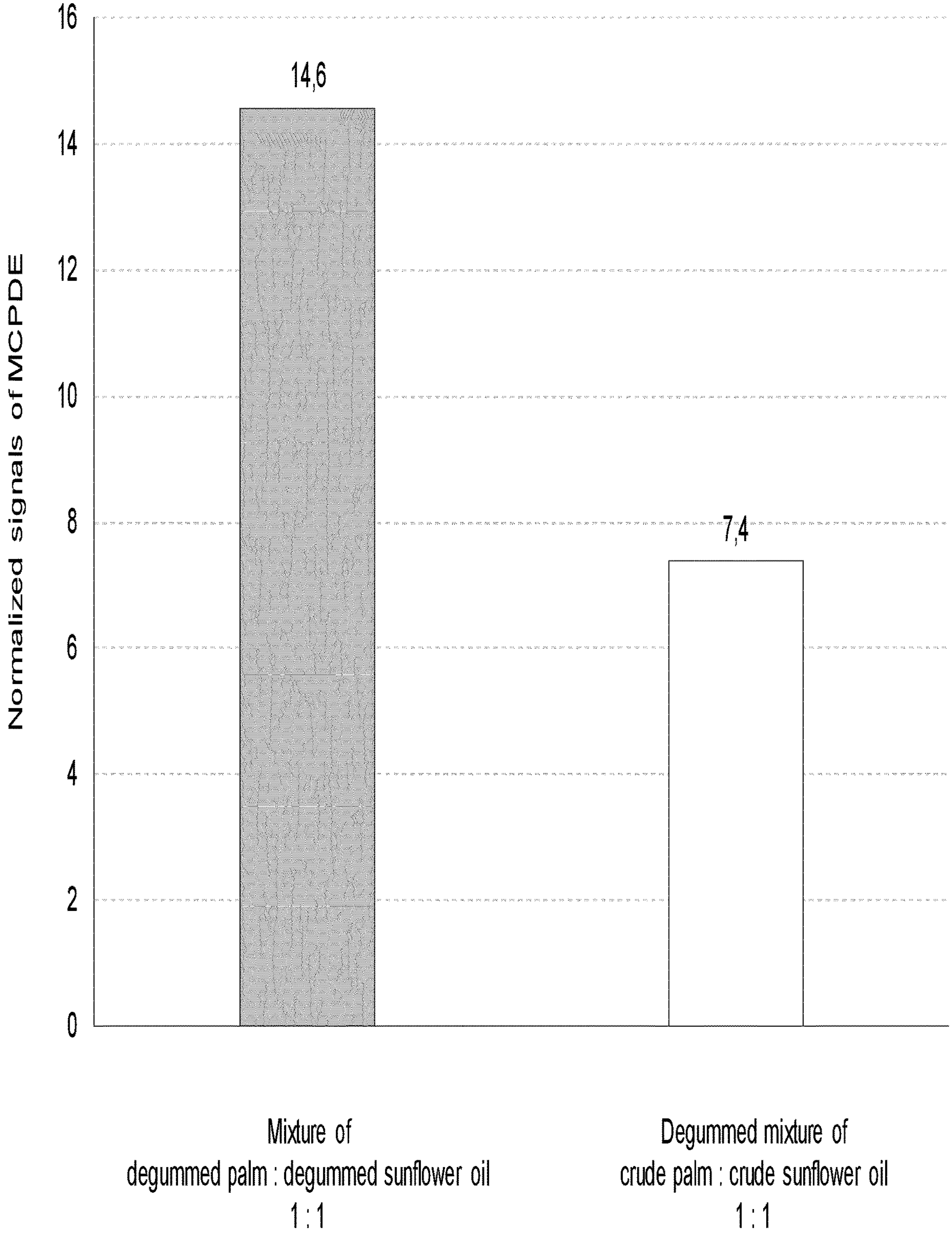
FIG. 1 shows the MCPDE levels of 1:1 mixture of individually degummed palm oil and sunflower oil and degummed 1:1 mixture of crude palm oil:crude sunflower oil.

The terms “comprising”, “comprises” and “comprised of” as used herein are synonymous with “including” or “includes”; are inclusive or open-ended and do not exclude additional, non-recited members, elements or steps. The terms “comprising”, “comprises” and “comprised of” also include the terms “consisting of”, “containing” or “contains”.

Admixing

As used herein, the term “admixing” refers to a process in which two or more components are mixed together in a receptacle (for example a vessel, reservoir, tube, tank, container, vial, or pot) to increase the homogeneity of the resulting admixture. The mixing may comprise one or a combination of several various common practices including agitation, stirring, sonication, mixing, high shear mixing, and/or shaking, optionally with heating for example to improve solubilization and/or melt a component and ensure that both components are liquid.

Purification

The purification is particularly suitable for removing insoluble fraction of oils that may contain chlorine/chloride carrying contaminants (substances that may serve as the chlorine source needed for formation of monochloropropanediols (MCPDs) or monochloropropanediol esters (MCPDEs)) from a starting triacylglyceride oil. A starting triacylglyceride oil as used herein throughout is taken to mean the triacylglyceride oil immediately before it is subjected to step (a) or step (h) of the method of the invention).

The method of the invention subjects the starting triacylglyceride oils to treatment that physically removes the insoluble, water soluble, precipitated fraction of oils containing chloride/chlorine carrying substances, which may be an active source of chlorine during oil refining, from the starting (e.g. crude) oils. The treatment is based on a combined purification process that leverages the purifying action of phospholipid and wax components present in certain crude oils in order to purify those oils that have less phospholipids and/or waxes. This way the method takes advantage of the high phospholipid- and/or wax-content of a crude oils or their gum extract to improve the purification of another, low-phospholipid oil.

As a result, the insoluble, sedimented, crystallized and water soluble chlorine or chloride containing substances, which potentially serve as a chlorine source, are enriched in the aqueous, gum and sedimented fraction of the oil and can be thus separated from the oil to be refined. The separation can occur via mechanical treatment such as centrifugation, settling, filtration or conventional degumming or other refining processes. The method of the invention can be applied to crude or partially refined triacylglycerol (also called triacylglyceride) oil which include but are not limited to palm oil, palm stearin, palm olein and their various fractions, palm kernel oil, coconut oil, sunflower oil, corn oil, high oleic sunflower oil and their variants, canola/rapeseed oil, soybean oil, fish oil, algae oil, oil obtained from yeast, oil obtained from fungi, cocoa butter and any mixtures or blends thereof.

The separation of insoluble and crystallized components from the triacylglyceride oil mixture can occur via filtration and/or decantation and/or centrifugation and/or pumping and/or draining.

The degumming step can include water degumming, acid degumming, combination thereof, dry degumming, base degumming, chemical refining, or combination thereof.

3-Halogen-1,2-propandiols, in particular 3-monochloro-1,2-propandiol (3-MCPD), are known contaminants in foods (Food Addit. Contam. (2006) 23: 1290-1298). For example, studies have indicated that 3-MCPD may be carcinogenic to rats if administered at high doses (Evaluation of Certain Food Additives and Contaminants, World Health Organisation, Geneva, Switzerland (1993) 267-285; Int. J. Toxicol. (1998) 17: 47). However, it has also been discovered that refined edible oils may contain 3-MCPD in its fatty acid ester form, while only containing very little amounts of free 3-MCPD (Food Addit. Contam. (2006) 23: 1290-1298). The European Food Safety Authority (EFSA) has recommended that 3-MCPD esters are treated as equivalent to free 3-MCPD in terms of toxicity (European Food Safety Authority (2008)).

It is well known that dehalogenation reactions can occur during thermal processes. For example, chlorine has been shown to leave chemical components as hydrogen chloride (gas) upon the input of sufficient activation energy, which is abundant during the deodorisation of vegetable oils at high temperatures (e.g. up to 270° C.). The inventors believe that hydrogen chloride may be evolved during oil refining from chlorine-containing compounds inherently present in the starting materials of the triacylglyceride oil refining process, for example plant materials.

Indeed, it has been suggested that MCPD generation reactions increase exponentially (>150° C.) and go to completion in a short time period.

Without wishing to be bound by theory, it is suggested that mechanistically, the MCPD di-esters may be formed during oil refinement via the protonation of the terminal ester group of triacylglycerides (TAG), which represent about 88-95% of total glycerides in most vegetable oils, through interaction with hydrogen chloride evolved during oil refining. The formed oxonium cation can then undergo intramolecular rearrangement, followed by nucleophilic substitution of chloride ion and the release of a free fatty acid and an MCPD di-ester.

Once removed through use of the method of the invention, the potential chlorine source is no longer available for the formation of chlorinated compounds, such as MCPD esters during the heating steps in oil refinement. Purified product oils are thereby obtained that will develop reduced quantity of monochloropropandiols (MCPDs) or monochloropropandiol esters (MCPDEs) when compared to the non-purified refined triacylglyceride oil when they are subjected to various refining practices with heat treatment e.g. deodorization.

In another embodiment, the quantity monochloropropandiol esters (MCPDEs) and MCPDs is reduced in the purified and heat treated triacylglyceride oil by at least 30%, 50%, 60%, 70%, 80%, 90%, 95% or 99% compared to the starting triacylglyceride oil purified without the auxiliary oil or its gum.

Refined oils produced using the method of the invention may contain, for example, less than 3 ppm, less than 1 ppm, less than 0.5 ppm, less than 0.3 ppm or preferably less than 0.1 ppm MCPDs.

Quantities of MCPDEs may be readily analysed using protocols well known in the art. For example, liquid chromatography/mass spectrometry (LC/MS)-based approaches are suitable for analysing levels of MCPDEs, as shown in the present Examples.

In one embodiment, the starting triacylglyceride oil input into step (a) of the method of the invention is crude triacylglyceride oil.

The term "crude oil" as used herein may refer to an unrefined oil. For example, in some embodiments, the starting triacylglyceride oil input into step (a) of the method of the invention has not been refined, degummed, bleached and/or fractionated. In a preferred embodiment, the starting triacylglyceride oil has not been deodorised before step (a).

In some embodiments, the starting triacylglyceride oil is subjected to preliminary processing before step (a), such as preliminary cleaning. However, any processes carried out on the starting triacylglyceride oil before step (a) preferably do not involve heating the triacylglyceride oil to a temperature greater than 100° C., 150° C., 200° C. or 250° C. In some embodiments, the triacylglyceride oil is subjected to preliminary refining, fractionation, hydrogenation and/or interesterification before step (a).

Triacylglyceride Oil

The term "triacylglyceride" can be used synonymously with "triacylglycerol" and "triglyceride". In these compounds, the three hydroxyl groups of glycerol are each esterified by a fatty acid. Oils that may be purified using the method of the invention comprise triacylglycerides and include plant oil, animal oil, fish oil, algal oil and combinations thereof.

In a preferred embodiment, the starting triacylglyceride oil is a plant oil. Example, plant oils include sunflower oil, corn oil, canola oil, soybean oil, coconut oil, palm oil, palm kernel oil and cocoa butter.

In another embodiment, the starting triacylglyceride oil is palm oil or fractionated palm oil such as palm olein, palm stearin, mid-fraction.

In a preferred embodiment, the starting triacylglyceride oil is a crude plant oil.

In one embodiment the starting triacylglyceride oil is obtained from single cell organisms.

In one embodiment, the starting triacylglyceride oil is obtained from fish.

In one embodiment, the starting triacylglyceride oil is obtained from algae.

In one embodiment, the starting triacylglyceride oil is obtained from fungi.

In one embodiment, the starting triacylglyceride oil is obtained from yeast.

In another preferred embodiment, the starting triacylglyceride oil is crude palm oil or fractionated crude palm oil such crude palm olein, crude palm stearin, crude mid-fraction.

In one embodiment, the plant oil is crude palm oil. In one embodiment, the plant oil is crude corn oil. In one embodiment, the plant oil is crude sunflower oil. In one embodiment, the plant oil is cold pressed crude canola oil. In one embodiment, the plant oil is crude soybean oil.

In a preferred embodiment, the plant oil is at least partially solvent extracted. Preferably, the solvent is n-hexane or a mixture of 2-propanol and n-hexane.

Crude Triacylglyceride Oil

In the case of palm oil, crude oil may be produced from different portions of palm fruit, e.g. from the flesh of the fruit known as mesocarp and also from seed or kernel of the fruit. The extraction of crude palm oil (CPO) from the crushed fruits can be carried out under temperatures ranging for example from 90 to 140° C.

In other cases, for example sunflower, crude oil may be produced by pressing, by solvent extraction or the combination thereof, for example as described by Gotor & Rhazi in Oilseeds & fats Crops and lipids 2016 (DOI: 10.1051/ocl/2016007).

Refined Oils

As used herein, the term "refined" may refer to oils that have been subjected to methods that improve the quality of the oil and include a heat treatment. This heat treatment may be a deodorisation step comprising steam distillation or short path distillation. Such heat treatment can be applied in the 150-300° C. range, more commonly in the 160-260° C. or the 160-240° C. range.

Gum

As used herein, the term "gums" may refer to the sludge, deposited impurities of meal particles, crystallized waxes, sediments, glycolipids, sugars and mainly phospholipid and phosphatide based precipitates that vegetable oils will throw on storage, cooling or upon the addition of acid and/or water. Gums can be removed from oils by one or more of water degumming, acid degumming, water-acid degumming, super degumming, TOP degumming, UF degumming, organic refining, dry degumming, caustic refining, sedimentation, crystallization and settling, and centrifugation [Chapter 6 Enzymatic degumming by Ch. Dayton & F. Galhardo in Green Vegetable Oil Processing].

Gum Extract

As used herein, the term "gum extract" may refer to the gum obtained from an oil or any of its fractions or components.

Lecithins

As used herein, the term "lecithin" may refer to the water soluble fraction of "gums". Accordingly, the term "gums" comprises the "lecithins" and "lysolecithins".

Heat Treatment

As used herein, the term "heat treatment" may refer to exposing the oil to temperatures in the 150-300° C. range, more commonly in the 160-260° C. or the 160-240° C. range. The heat treatment may be applied in closed vessels or in ampoules or in combination with vacuum and/or steam as it is done in the industrial setting during deodorization (steam distillation or short path distillation).

Chlorine and Chloride

Chlorine is a chemical element with symbol Cl and atomic number 17. Chlorine can be found in a wide range of substances both in ionic (e.g. sodium chloride) and covalent form (e.g. polyvinyl chloride). Accordingly, the terms "chlorine" and "chloride" both refer to substances that contain the chlorine element in various forms.

As used herein, the terms "chlorine containing", "chloride containing", "organochlorine", "chlorine donor", all refer to substances that in any format contain the chlorine element. This format can be either ionic, polar covalent or covalent.

Chlorine or Chloride Carrying Substances

As used herein, the terms "chlorine or chloride carrying substances" refer to substances that in any format contain the chlorine element. This format can be either ionic, polar covalent or covalent.

Chlorine Donor

As used herein, the terms "chlorine donor" refer to substances that in any format contain the chlorine element and may release the chlorine in any form for example but not restricted to hydrochloric acid, hypochlorite, chloride anion.

Acidity and pH

In chemistry, pH is a scale used to specify how acidic or how basic is a water-based solution. Similarly, as used herein, the term "pH" and the term "acidity" refer to the free acid content of the oil samples. For example when mixing the oil with phosphoric acid can be considered as lowering its pH. Similarly, a neutralization step with the addition of sodium hydroxide to the oil can be considered as increasing the pH of the oil.

Melting Temperature

The term "melting temperature" as used herein may refer to the temperature at which a solid changes state from solid to liquid at a pressure of 100 kPa. For example, the melting temperature may be the temperature at which a solid changes state from solid to liquid at a pressure of 100 kPa when heated at 2° C. per minute.

The skilled person is readily able to select suitable methods for the determination of the melting temperature of the triacylglyceride oil.

For example, apparatus for the analysis of melting temperatures may consist of a heating block or an oil bath with a transparent window (e.g. a Thiele tube) and a magnifier. A sample of the solid may be placed in a thin glass tube and placed in the heating block or immersed in the oil bath, which is then gradually heated. The melting of the solid can be observed and the associated melting temperature noted.

For fats and oils with highly complex triacylglycerol composition, the method of Slip Melting Point is a commonly used reference (AOCS Official method Cc 3-25).

Centrifugation

The term "centrifugation" as used herein may refer to the rapid rotation of a vessel including its oil content in order to exert centrifugal force on the vessel and its content.

In one embodiment, the centrifugation occurs at elevated temperatures at which the oil is in the liquid state. This temperature can be 30° C., 40° C., 50° C., 60° C., 70° C., 80° C., 100° C. or above for palm oil and 50° C., 60° C., 80° C., 100° C. or above for palm stearin, 15° C., 20° C. or above for palm olein, 5° C. or above for seed oils including sunflower oil, canola/rapeseed oil, corn oil.

In a preferred embodiment, the temperature can be between 30° C. and 80° C. for palm oil, preferably between 35° C. and 70° C. In a preferred embodiment, the temperature can be between 5° C. and 20° C. for sunflower oil. In a preferred embodiment, the centrifugation speed is at least 15,000 g for 15 min.

Settling

The term "settle" or "settling" as used herein may refer to setting the oil vessel into a movement free or substantially movement free environment, preferably avoiding its disturbance for a period of time that can be at least 4 hours, 6 hours, 1 day, 2 days, a week or a month.

In one embodiment, the oil vessel is settled into a fixed, movement free environment and its disturbance avoided for a period of time of at least 5 months, for example for crude sunflower oil or crude soybean oil. In one embodiment, the crude oil is heated to at least 60° C. prior to settling.

In one embodiment, the oil vessel is settled into a fixed, movement free environment and its disturbance avoided for a period of time of at least 4 days, for example for cold pressed crude canola oil.

Soap

As used herein, the term "soap" may refer to a variety of cleansing and lubricating products produced from substances with surfactant properties.

In the vegetable oil refining context and the current context the term "soap" is used to describe alkali carboxylates which are the salt of fatty acids formed by the negatively charged deprotonated fatty acid and a positively charged counter ion e.g. a sodium or a potassium cation. [Bailey's Industrial Oil and Fat Products—6th edition, page 3084—Soap raw materials and their processing page 105; Wikipedia]

As it is well known in the literature of alkali refining practices, free fatty acids react with alkali e.g. sodium hydroxide or potassium hydroxide to form such soaps [The Lipid Handbook—Third Edition; edited by Frank D. Gunstone; page 178, 191].

Further Refinement

As the insoluble oil components along with their chlorine donor substances are depleted by the method of the invention, heating during any subsequent refinement processes will not cause significant generation of unwanted chlorinated compounds, such as the MCPDEs.

Processes for carrying out refinement, degumming, bleaching, deodorisation and fractionation are well known in the art.

By way of example, refinement of plant oil, such as vegetable oil, typically consists of physical refining or chemical refining.

In efforts aimed at increased sustainability, oil refineries have modified their plant oil processing lines in the past few decades for the minimisation of energy expenditure (economisers) and the reduction of waste. However, the steps of these two refining processes have essentially remained the same.

Physical refining is essentially an abridged form of chemical refining and was introduced as the preferred method of palm oil refining in 1973. It may be a three step continuous operation where the incoming oil is pre-treated with acid (degumming), cleansed by being passed through adsorptive bleaching clay, and then subjected to steam distillation. This process allows for the subsequent deacidification, deodorisation and decomposition of carotenoids unique to palm oil (i.e. the crude oil is deep red in colour, unlike other vegetable oils). Given the lack of neutralisation step in physical refining, refined bleached (RB) oil produced from a physical refinery contains nearly the same free fatty acid (FFA) levels as found in the crude oil.

Neutralised bleached (NB) oil from a chemical refinery and RB palm oil are comparable pre-deodorisation in every other aspect.

The heat bleaching unit operation is the main source of loss in the oil refining process resulting in 20-40% reduction in oil volume post filtration. The process typically lasts for about 30-45 min and typically takes place under 27-33 mbar vacuum at a temperature of 95-110° C.

Heat bleached oil may then be rerouted in piping to a deaerator that aides in the removal of dissolved gases, as well as moisture, before being sent to a deodorisation tower.

A bleaching step may comprise heating the oil and cleaning the oil by passing it through adsorptive bleaching clay.

A deodorisation step may comprise steam distillation.

The skilled person will understand that they can combine all features of the invention disclosed herein without departing from the scope of the invention as disclosed.

Preferred features and embodiments of the invention will now be described by way of non-limiting examples.

The practice of the present invention will employ, unless otherwise indicated, conventional techniques of chemistry, biochemistry, molecular biology, microbiology and immunology, which are within the capabilities of a person of ordinary skill in the art. Such techniques are explained in the literature. See, for example, Sambrook, J., Fritsch, E. F. and Maniatis, T. (1989) Molecular Cloning: A Laboratory Manual, 2nd Edition, Cold Spring Harbor Laboratory Press; Ausubel, F. M. et al. (1995 and periodic supplements) Current Protocols in Molecular Biology, Ch. 9, 13 and 16, John Wiley & Sons; Roe, B., Crabtree, J. and Kahn, A. (1996) DNA Isolation and Sequencing: Essential Techniques, John Wiley & Sons; Polak, J. M. and McGee, J. O'D. (1990) In Situ Hybridization: Principles and Practice, Oxford University Press; Gait, M. J. (1984) Oligonucleotide Synthesis: A Practical Approach, IRL Press; and Lilley, D. M. and Dahlberg, J. E. (1992) Methods in Enzymology: DNA Structures Part A: Synthesis and Physical Analysis of DNA, Academic Press. Each of these general texts is herein incorporated by reference.

EXAMPLES

Analytical Procedures Used in the Examples

Sample Preparation

Oil samples were diluted stepwise prior to injection.

1) Firstly, 100 μL of each sample was transferred into a vial and 900 μL of a mixture of n-Hexane:Acetone (1:1 v/v) was added. The sample was vortexed for 5-10 s.
2) In the second step, 50 μL of this solution was further diluted by mixing it with 950 μL of acetone. The obtained solution was vortexed for 5-10 s.
3) 100 μL of this latter solution was mixed with 90 μL of methanol and 10 μL of internal standard mix solution. (the internal standard mix solution contained at 2 ng/μL concentration the following stable isotope labeled compounds solubilized in methanol: 1-oleoyl 2-linoleoyl 3-chloropropanediol-$^2H_5$ (OL), 1-2-dipalmitooyl 3-chloropropanediol-$^2H_5$ (PP), 1-palmitoyl 2-oleoyl 3-chloropropanediol-$^2H_5$ (PO), 1-palmitoyl 2-linoleoyl 3-chloropropanediol-$^2H_5$ (PL).

LC Conditions

Ultra high performance liquid chromatography was performed using a Waters Acquity H-class system equipped with a silica based octadecyl phase (Waters Acquity HSS C18, 1.7 μm; 2.1×150 mm). The applied solvent gradient is summarised in Table 3.

TABLE 3

Details of the applied LC gradient (solvent A was 1 mM ammonium-formate in methanol; and solvent B was 100 μM ammonium-formate in isopropanol).

| Time [min] | Solvent A [%] | Solvent B [%] | Flow rate [μL/min] |
|---|---|---|---|
| 0 | 100 | 0 | 400 |
| 15.0 | 100 | 0 | 300 |
| 18.0 | 50 | 50 | 200 |
| 25.0 | 0 | 100 | 200 |
| 32.5 | 0 | 100 | 180 |
| 33.0 | 0 | 100 | 150 |
| 35.0 | 100 | 0 | 150 |
| 40.0 | 100 | 0 | 400 |
| 42.0 | 100 | 0 | 400 |

MS Conditions

Monitoring of monochloropropandiol (MCPD) esters was performed using Thermo Fisher high resolution mass spectrometer (Orbitrap Elite Hybrid). This platform enabled highly selective mass analysis at a routine mass accuracy of −2 ppm. MCPD esters were monitored in ESI positive ion mode (ESI$^+$). Under these conditions the observed MCPD ester ions were the $[M+NH_4]^+$ and $[M+Na]^+$ adducts.

Data Interpretation

The relative quantification of MCPDE was performed by first extracting the ion chromatograms of the $[M+NH_4]^+$ and $[M+Na]^+$ adducts at their respective m/z value in a 10 ppm mass window and then integrating the resulting peak areas at the corresponding chromatographic retention time. The abbreviations of the monitored MPCDEs are as following: PP: dipalmitoyl MCPD ester; PO: palmitoyl-oleyl MCPD ester; OO: dioleyl MCPD ester; OL: oleyl-linoleyl MPCD ester; LL: dilinoleyl MPCD ester; PL: palmitoyl-linoleyl MPCD ester.

For every experiment, the peak heights of the PP, PO, OO, OL, PL and LL MCPD were summed up, multiplied by 1000 and divided by the peak heights of the above described four stable isotope labeled internal standards. This allowed easy and fast comparison and visualization of the relative MCPDE levels in the investigated samples.

In-Ampoule Heat Treatment of the Samples

The heat treatment of crude oil samples was performed in sealed glass ampoules under nitrogen for 2 h at 230° C. in a Thermo Scientific Heraeus oven (serie 6100). The glass ampoules were fabricated from glass Pasteur pipettes using a Bunsen gas burner. These conditions were chosen in order to mimic the thermal conditions used during edible-oil deodorisation.

Examples 1 & 2

Industrially Produced Crude Palm Oil

Industrially produced crude palm oil was purchased from Nutriswiss (Lyss, Switzerland). The oil was subjected to mitigation trials followed by a centrifugation based pre-purification.

6 L of crude palm oil was melted by heating to 80° C. in a water bath. The oil was homogenized by manual shaking. 1 L aliquots were transferred into 1 L polypropylene tubes (Sorvall 1000 mL) and centrifuged at 8000 g for 15 min at 40° C. in a Thermo Scientific Heraeus Cryofuge 8500i centrifuge. The sediment-free upper 90% (v/v) of the oil was used for further trials.

Pressed Sunflower Oil

Sunflower seeds were pressed using a home electrical oil press (OP 700, Rommelsbacher, Germany) resulting in pressed oil and remaining solid residue (cake). The pressed oil was then filtered through filter paper (Whatman 595½) at 65° C. in an oven.

Water Acid Degumming

Individual crude palm oil, pressed crude sunflower oil and their 1:1 mixtures were degummed by heating the oils to 80° C., phosphoric acid≥85% was then added in amount of 0.02% by volume of the oil. The mixture was sheared (Silverson LM-5A) for 5 min at 1500 rpm at 80° C. Addition of water (2% by the volume of the mixture) followed and shearing (Silverson LM-5A) for 5 min keeping the temperature at 80° C. was carried out. Centrifugation followed for 15 min at 15000 g and 40° C. (Centrifuge 5804R, Eppendorf, VWR International GmbH, Switzerland). The upper 90% (v/v) degummed liquid phase was used for further work.

The resulting degummed 1:1 mixture of crude palm oil:crude sunflower oil and 1:1 mixture of individually degummed palm oil and sunflower oil were subjected to heat treatment in ampoules as described above in order to simulate the formation of MCPDEs and were analysed by LC-MS for their MCPDE content accordingly. The benefit of crude sunflower oil during the degumming process is demonstrated by the observed MCPDE levels shown in FIG. 1. The mixture that was mixed before the degumming step developed two times lower MCPD levels than the mixture that was mixed after the degumming step.

Figure 2:
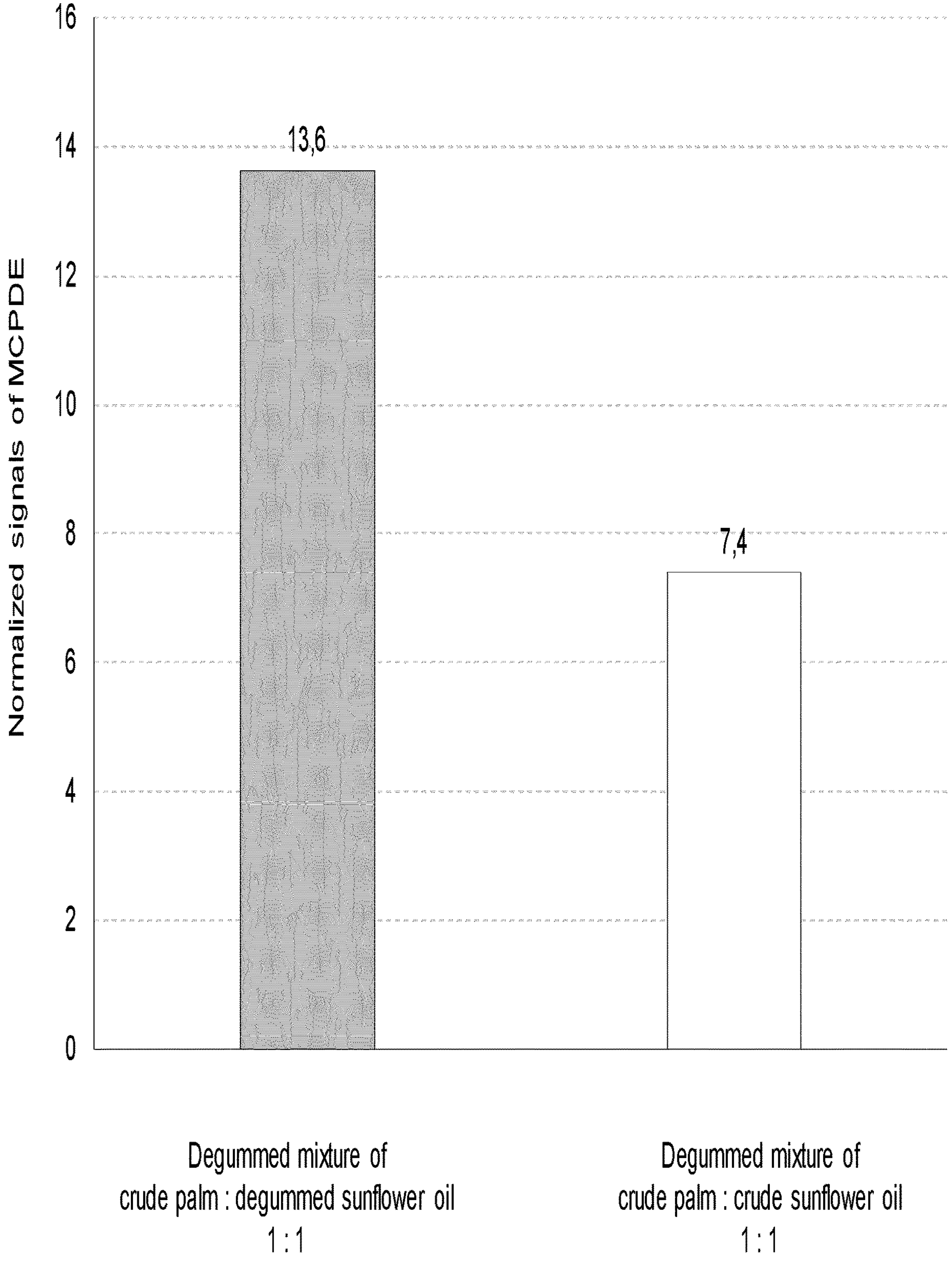
FIG. 2 shows the MCPDE levels of degummed 1:1 mixture of crude palm oil:degummed sunflower oil and degummed 1:1 mixture of crude palm oil:crude sunflower oil.

Further, this beneficial effect was only observable when the sunflower oil was crude and not degummed. When the crude palm oil was subjected to degumming in the presence of already degummed sunflower oil, two times higher MCPD levels were observed in comparison to the mixture that contained the crude, not degummed sunflower oil, see FIG. 2. This suggests, that indeed the gum fraction of crude sunflower oil is responsible for the benefit observed as reduced MCPD content of the oil mix.

Example 3

Industrially Produced Crude Palm Oil

Industrially produced crude palm oil was purchased from Nutriswiss (Lyss, Switzerland). The oil was subjected to mitigation trials followed by a centrifugation based pre-purification.

6 L of crude palm oil was melted by heating to 80° C. in a water bath. The oil was homogenized by manual shaking. 1 L aliquots were transferred into 1 L polypropylene tubes (Sorvall 1000 mL) and centrifuged at 8000 g for 15 min at 40° C. in a Thermo Scientific Heraeus Cryofuge 8500i centrifuge. The sediment-free upper 90% (v/v) of the oil was used for further trials.

Commercially available 1,2-ditricosanoyl-sn-glycerol-3-phosphocholine (cat. n. 850372P) was from Avanti Polar Lipids Inc. (Alabaster, Alabama, US). The saturated long chain fatty acyl chains contain 23 carbon atoms each.

A 10 mL aliquot of sediment-free crude palm oil was spiked with 0.4% (w/w) 1,2-ditricosanoyl-sn-glycerol-3-phosphocholine. The mixture was heated to 90° C. for 15 min and vortexed to allow homogenization. Then the mixture was centrifuged for 15 min at 15000 g at 40° C. (Centrifuge 5804R, Eppendorf, VWR International GmbH, Switzerland). The upper 10% (v/v) and the lower, solid containing 10% (v/v) was taken for heat treatment and subsequent LC-MS analysis.

On one hand, the MCPD levels calculated as described above in section Data interpretation show that addition, crystallization and centrifugation of 1,2-ditricosanoyl-sn-glycerol-3-phosphocholine reduced the relative MCPD signals from 71.7 (reference sample with 0% added phosphocholine) to 39 (0.4% added phosphocholine).

Figure 3:
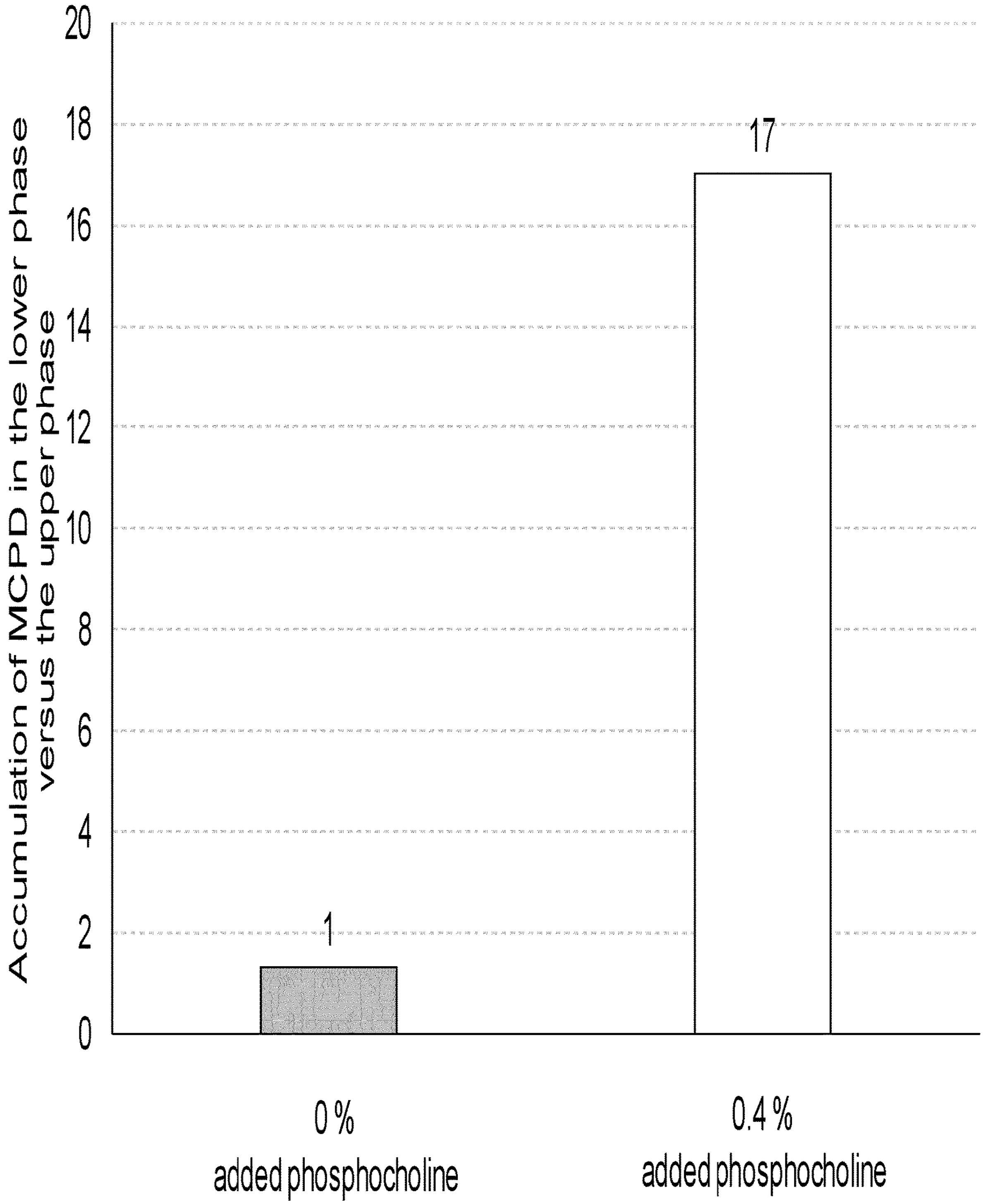
FIG. 3 shows the MCPD accumulation factors in the upper 10% (v/v) and lower 10% (v/v) fraction for the palm oil centrifuged with 0% (reference) or 0.4% added phosphocholine.

Furthermore, following the extraction of MCPD signals, the ratio of MCPD as an accumulation factor observed between the upper 10% (v/v) and lower 10% (v/v) was calculated. This accumulation factor is shown in FIG. 3 for the palm oil centrifuged with 0% (reference) or 0.4% added phosphocholine. The results show that the addition, crystallization and centrifugation of 1,2-ditricosanoyl-sn-glycerol-3-phosphocholine allows a more effective concentration of the chlorine source from the oil into the lower phase hereby purifying more efficiently the upper phase.

Example 4

Industrially Produced Crude Palm Oil

Industrially produced crude palm oil was purchased from Nutriswiss (Lyss, Switzerland). The oil was subjected to mitigation trials followed by a centrifugation based pre-purification.

6 L of crude palm oil was melted by heating to 80° C. in a water bath. The oil was homogenized by manual shaking. 1 L aliquots were transferred into 1 L polypropylene tubes (Sorvall 1000 mL) and centrifuged at 8000 g for 15 min at 40° C. in a Thermo Scientific Heraeus Cryofuge 8500i centrifuge. The sediment-free upper 90% (v/v) of the oil was used for further trials.

Pressed Sunflower Oil

Sunflower seeds were pressed using a home electrical oil press (OP 700, Rommelsbacher, Germany) resulting in pressed oil and remaining solid residue (cake). The pressed oil was then filtered through filter paper (Whatman 595½) at 65° C. in an oven.

Water Acid Degumming

The oil was heated to 80° C. and phosphoric acid≥85% was then added in amount of 0.02% by volume of the oil. The oil was then sheared (Silverson LM-5A) for 5 min at 1500 rpm at 80° C. Addition of water (2% by the volume of the mixture) followed and the mixture was sheared (Silverson LM-5A) for 15 min keeping the temperature at 80° C. Centrifugation followed for 15 min at 15000 g at 40° C. (Centrifuge 5804R, Eppendorf, VWR International GmbH, Switzerland). The upper 90% (v/v) degummed liquid phase was used for further work.

500 mL pressed crude sunflower has been subjected to wet acid degumming. The recovered gum phase was used to add gum aliquots at various quantities to crude palm oil before its wet acid degumming in order to investigate a dose-response relationship between the quantity of the added sunflower gum extract and the ultimately observed mitigation benefit on the MCPD levels.

Sunflower gum aliquots were taken that corresponded to 2, 10 and 30 mL of crude sunflower oil. These gums were then added to 10 mL aliquots of crude palm oil before its degumming representing 0.2, 1 and 3 volume equivalent gum additions.

Then the resulting mixtures were subjected to the same wet acid degumming process and subsequent heat treatment and LC-MS analysis as described above.

Figure 4:
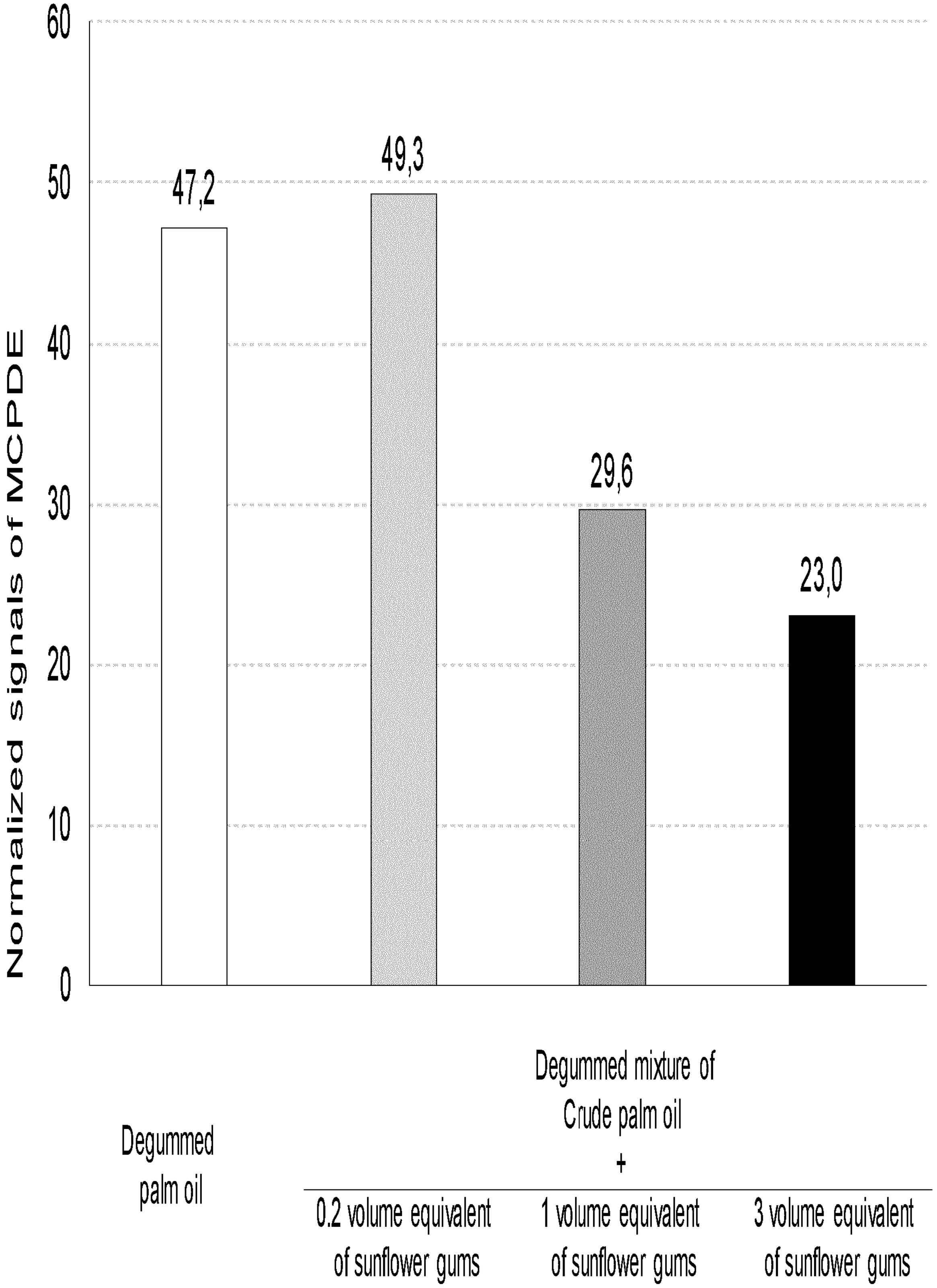
FIG. 4 shows the MCPD levels of degummed palm oil; and degummed mixture of crude palm oil with 0.2, 1, and 3 volume equivalent of sunflower gums.

The MCPD levels observed in the heat treated oils, as shown in FIG. 4, confirm that indeed the addition of sunflower gums before the degumming process results in reduced formation of MCPD and this benefit shows a dose-response relationship.

Example 5

Industrially Produced Crude Fish Oil

Industrially produced crude fish oil was obtained from Sofinol S.A. (Manno, Switzerland).

Pressed Sunflower Oil

Sunflower seeds were pressed using a home electrical oil press (OP 700, Rommelsbacher, Germany) resulting in pressed oil and remaining solid residue (cake). The pressed oil was then filtered through filter paper (Whatman 595½) at 65° C. in an oven.

Analysis of Total MCPD by the Official AOCS Method

The samples were submitted to SGS (SGS Germany GmbH, Hamburg, Germany) for analysis by the AOCS Cd 29b-13 method, which determines the free 2-, and 3-MCPD and the sum of their respective esterified (bound) forms each.

The beneficial effect of pressed sunflower oil as auxiliary oil was studies in four types of fish oil containing samples, as describe below:

Crude Fish Oil 10 mL aliquots of crude fish oil were equilibrated at 60° C. for 30 min, then centrifuged for 15 min at 15000 g at 40° C. (Centrifuge 5804R, Eppendorf, VWR International GmbH, Switzerland). The upper 10% (v/v) and the lower 10% (v/v) were taken for heat treatment and subsequent MPCD analysis at SGS.

Mixture of Solid Crude Fish Oil and Pressed Crude Sunflower Oil

Crude fish oil was centrifuged for 15 min at 15000 g at room temperature (Centrifuge 5804R, Eppendorf, VWR International GmbH, Switzerland) and the resulting solid fraction was separated and used for further work. This solid fraction of crude fish oil was mixed with pressed crude sunflower in a 1:1 proportion, heated to 80° C. and homogenized by vortexing for 10 seconds. The resulting mixture was allowed to cool to room temperature and was stored at ambient temperature for one month. Then the mixture was centrifuged at room temperature for 15 min at 15000 g (Centrifuge 5804R, Eppendorf, VWR International GmbH, Switzerland) in order to obtain the separated solid and liquid fraction of the mixture.

Liquid and Solid Fractions Obtained from the Mixture of Solid Crude Fish Oil and Pressed Crude Sunflower Oil The above obtained liquid and solid fractions obtained from the mixture of solid crude fish oil and pressed crude sunflower oil were equilibrated at 45° C. to allow complete melting of the samples. Then the samples were centrifuged for 15 min at 15000 g at 40° C. (Centrifuge 5804R, Eppendorf, VWR International GmbH, Switzerland). The upper 10% (v/v) and the lower 10% (v/v) fraction of each sample were taken for heat treatment and subsequent MCPD analysis at SGS.

Figure 5:
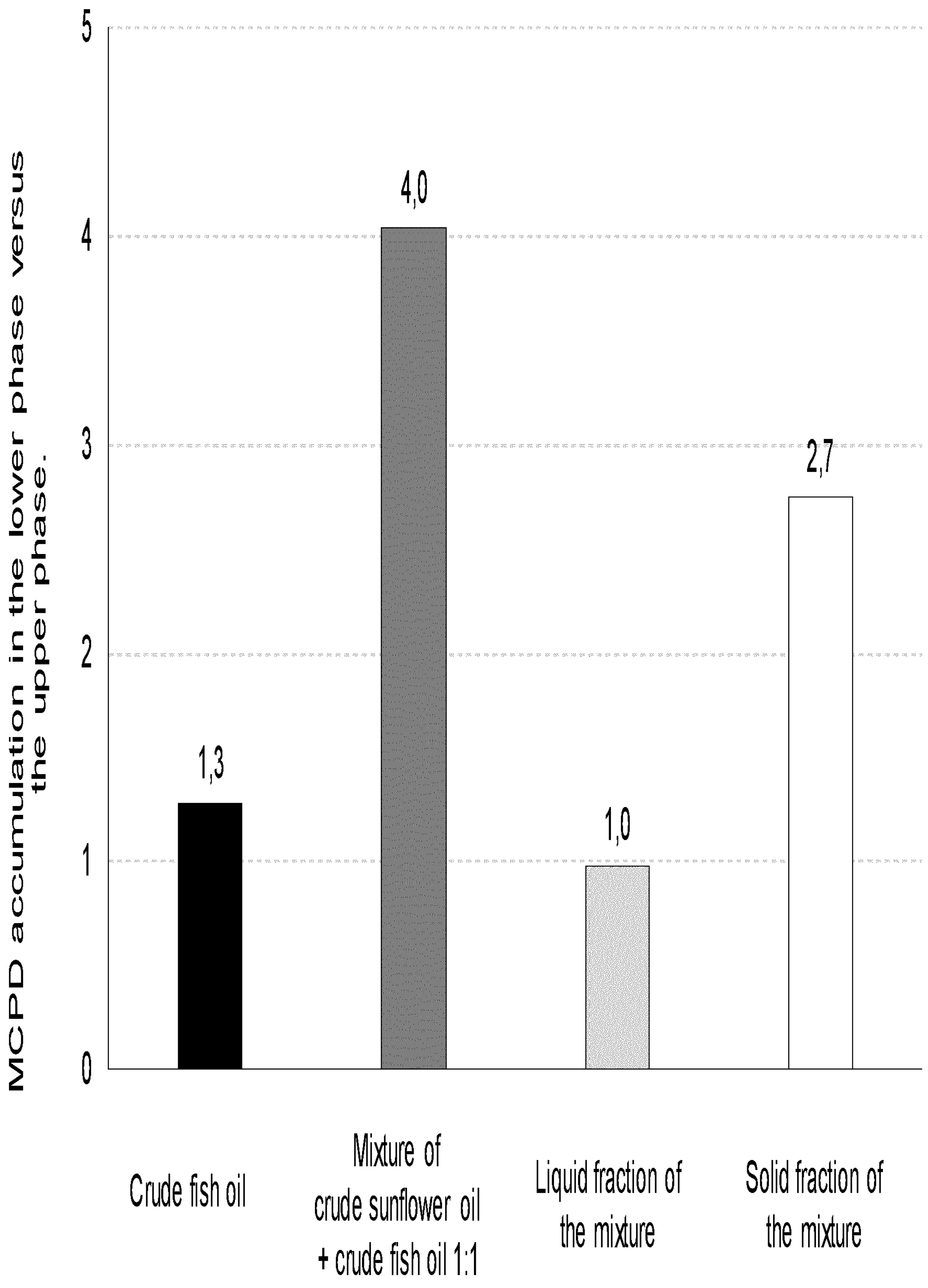
FIG. 5 shows the MCPD accumulation factors in the upper 10% (v/v) and lower 10% (v/v) fraction for crude fish oil, 1:1 mixture of crude sunflower oil:crude fish oil, the liquid faction of the mixture, and the solid fraction of the mixture.

The results in FIG. 5 show that when crude fish oil was subjected to centrifugation, only a mild benefit could be observed with 3.8 ppm 3-MCPD detected in the upper phase and 4.9 ppm 3-MCPD detected in the lower phase. This corresponds to about a factor of 1.3 accumulation in the lower phase.

When the solid fraction of crude fish oil is mixed however with pressed crude sunflower oil, very different MCPD levels were observed in the liquid and solid fractions, 1.2 ppm and 4.7 ppm 3-MCPD respectively. This suggests an accumulation factor of 4 between the liquid and the solid fraction, see second bar in FIG. 5. This result also suggest that the source of MCPD was largely concentrated in the solid phase and the liquid phase was purified. To demonstrate that this accumulation effect is due to the centrifugation itself, we have heated both fractions to 45° C. to allow complete melting of the solid fraction, and subjected them to centrifugation as described above. As expected, the obtained upper and lower phases from the liquid fraction showed the same 3-MCPD levels, 1.1 ppm and 1.1 ppm respectively. However, the upper and lower phases obtained from the solid fraction showed 3-MCPD levels of 2.8 ppm and 7.6 ppm respectively. This is equivalent to an accumulation factor of 2.7 in the lower phase (see fourth bar in FIG. 5) and confirms that indeed the centrifugation concentrated the precursors of MCPDs in the lower phase.

Example 6

Benefit of Auxiliary Degumming on Bleached Palm Oil

LC-MS analytical procedures were performed as described at the beginning of the Examples section above.

Industrially Produced Crude Palm Oil

Industrially produced crude palm oil was purchased from Nutriswiss (Lyss, Switzerland). The oil was subjected to centrifugation based pre-purification. 5 L of the industrial crude palm oil was equilibrated at 60° C. for 30 min in a water bath and then homogenized vigorously by manual shaking. 40 mL aliquots were transferred into 50 mL Falcon® tubes and were centrifuged at 15000 g for 15 min at 40° C. (Centrifuge 5804R, Eppendorf, VWR International GmbH, Switzerland). The sediment-free upper 90% v/v corresponding to 36 mL aliquots were taken from the of each Falcon® tube, were combined and used for further work.

Pressed Sunflower Oil

Sunflower seeds were pressed using a home electrical oil press (OP 700, Rommelsbacher, Germany) resulting in pressed oil and remaining solid residue (cake). The pressed oil was then filtered through filter paper (Whatman 595½) at 65° C. in an oven.

Production of Gum from Sunflower Oil

Pressed crude sunflower oil was degummed by first heating the oils to 80° C. then adding 0.02% v/v phosphoric acid (≥85% grade). The mixture was sheared in a Silverson LM-5A mixer for 5 min at 1500 rpm at 80° C. Then 2% v/v of water was added and this mixture was further sheared for 5 min while keeping the temperature at 80° C. The mixture was then transferred into 40 mL Falcon tubes and was centrifuged for 15 min at 15000 g at 40° C. (Centrifuge 5804R, Eppendorf, VWR International GmbH, Switzerland). The upper 90% v/v of the oil was taken off and the lower 4 mL of the liquid phase including the precipitated gums at the bottom of the tubes was used as the "gum" for further work.

Water Acid Degumming of Palm Oil

The oil was heated to 80° C. and phosphoric acid≥85% was then added in amount of 0.02% by volume of the oil. The oil was then sheared (Silverson LM-5A) for 2 min at 1500 rpm at 80° C. Addition of water (2% by the volume of the mixture) followed and the mixture was sheared (Silverson LM-5A) for 2 min keeping the temperature at 80° C. Centrifugation followed for 15 min at 15000 g at 40° C. (Centrifuge 5804R, Eppendorf, VWR International GmbH, Switzerland). The upper 90% (v/v) degummed liquid phase was used for further work.

Bleaching of Degummed Palm Oil

The degummed palm oil was transferred into a round 0.5 L rotary evaporator flask heated at 85° C. in a water bath and 1% of bleaching earth (Tonsil 112FF) was added. The flask was rotated at 240 rpm and temperature was increased and kept at 95° C. while vacuum was applied at 50 mbar for 20 min. Finally, the oil was filtered via a vacuum Millipore filtration apparatus using a Whatman filter 8 μm. The resulting bleached palm oil was subjected to heat treatment and LC-MS analysis as described above.

Auxillary Degumming of Bleached Palm Oil

Addition of Sunflower Gum to Palm Oil

Gum was obtained from sunflower oil as described above. Then 2 volume equivalent quantity of sunflower gum was added to bleached palm oil. In this case this corresponded to adding sunflower gum obtained from 500 mL sunflower oil to 250 mL bleached palm oil. The mixture was homogenized by shearing in a Silverson LM-5A for 2 min at 1500 rpm at 80° C.

Water Acid Degumming of the Mixture of Sunflower Gum and Bleached Palm Oil

The mixture containing the sunflower gum and the bleached palm oil was heated to 80° C. and phosphoric acid≥85% was then added in amount of 0.02% by volume. The mixture was then sheared (Silverson LM-5A) for 2 min at 1500 rpm at 80° C. Addition of water (2% by the volume of the mixture) followed and the mixture was sheared (Silverson LM-5A) for 2 min keeping the temperature at 80° C. Centrifugation followed for 10 min at 15000 g at 40° C. (Centrifuge 5804R, Eppendorf, VWR International GmbH, Switzerland). The upper 90% (v/v) degummed liquid phase was taken off and subjected to heat treatment and LC-MS analysis as described above.

Figure 6:
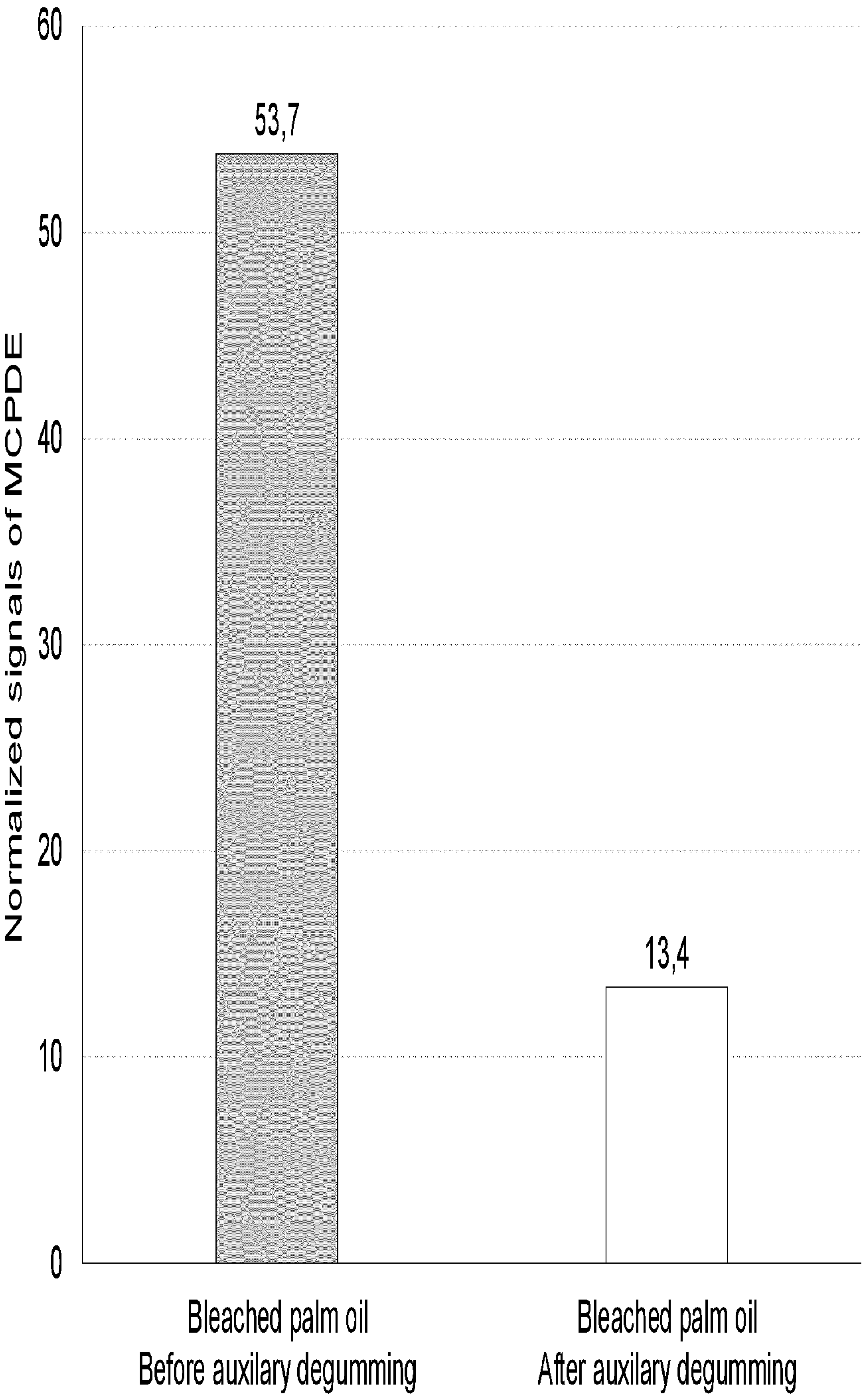
FIG. 6 shows the MCPD levels of bleached palm oil before and after auxiliary degumming.

The MCPD diester levels observed in these bleached, heat treated oils confirm that indeed the auxiliary degumming including the addition of sunflower gums after the bleaching process results in reduced formation of MCPD (FIG. 6).

For examples 7 to 11, the description of ampoule heating, analytical procedures and data interpretation for the LC-MS analysis can be found as previously described above. Where indicated, the samples were sent to the external laboratory SGS (SGS Germany GmbH, Hamburg, Germany) for confirmatory analysis by the Official AOCS Cd 29b-13 method. This method determines the free 2-, and 3-MCPD and the sum of their respective esterified (bound) forms each.

Example 7

Figure 15:
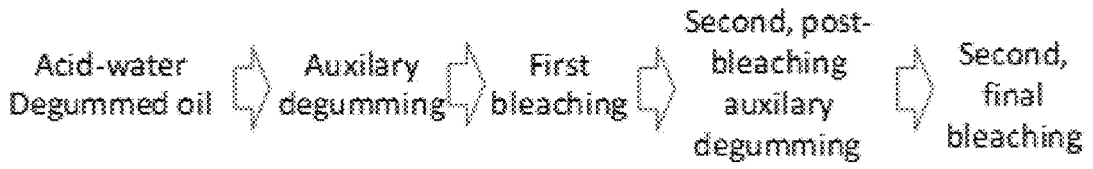
FIG. 15 shows the key steps of Example 7.

Benefit of a second auxiliary degumming The key steps of this example are summarized in FIG. 15.

Industrially Produced Crude Palm Oil

Industrially produced crude palm oil was purchased from Nutriswiss (Lyss, Switzerland). The oil was subjected to centrifugation based pre-purification. 5 L of the industrial crude palm oil was equilibrated at 60° C. for 30 min in a water bath and then homogenized vigorously by manual shaking. 40 mL aliquots were transferred into 50 mL Falcon® tubes and were centrifuged at 15000 g for 15 min at 40° C. (Centrifuge 5804R, Eppendorf, VWR International GmbH, Switzerland). The sediment-free upper 80%% v/v corresponding to 36 mL aliquots were taken from the of each Falcon® tube, were combined and used for further work.

Pressed Sunflower Oil

Sunflower seeds were pressed using a home electrical oil press (OP 700, Rommelsbacher, Germany) resulting in pressed oil and remaining solid residue (cake). The pressed oil was then filtered through filter paper (Whatman 595½) at room temperature.

Production of Gum from Sunflower Oil

Pressed crude sunflower oil was degummed by first heating the oils to 80° C. then adding 0.02% v/v phosphoric acid (85% grade). The mixture was sheared in a Silverson LM-5A mixer for 5 min at 1500 rpm at 80° C. Then 2% v/v of water was added and this mixture was further sheared for 5 min while keeping the temperature at 80° C. The mixture was then transferred into 40 mL Falcon tubes and was centrifuged for 15 min at 15000 g at 40° C. (Centrifuge 5804R, Eppendorf, VWR International GmbH, Switzerland). The upper 95% v/v of the oil was taken off and the remaining lower phase including the precipitated gums at the bottom of the tubes was used as the "gum" for further work.

Water Acid Degumming of Palm Oil

The oil was heated to 80° C. and phosphoric acid≥85% was then added in amount of 0.02% by volume of the oil. The oil was then sheared (Silverson LM-5A) for 2 min at 1500 rpm at 80° C. Addition of water (2% by the volume of the mixture) followed and the mixture was sheared (Silverson LM-5A) for 2 min keeping the temperature at 80° C. Centrifugation followed for 15 min at 15000 g at 40° C. (Centrifuge 5804R, Eppendorf, VWR International GmbH, Switzerland). The upper 90% (v/v) degummed liquid phase was used for further work.

First Step Auxiliary Degumming

Addition of Sunflower Gum to Degummed Palm Oil

Gum was obtained from sunflower oil as described above. Then 2 volume equivalent quantity of sunflower gum was added to acid-water degummed palm oil. In this case this corresponded to adding sunflower gum obtained from 80 mL sunflower oil to 40 mL degummed palm oil. The mixture was homogenized by shearing in a Silverson LM-5A for 4 min at 5000 rpm at 80° C.

Water Acid Degumming of the Mixture of Sunflower Gum and Palm Oil

The above mixture containing the sunflower gum and the acid-water degummed palm oil was heated to 80° C. and phosphoric acid≥85% was then added in amount of 0.02% by volume. The mixture was then sheared (Silverson LM-5A) for 2 min at 5000 rpm at 80° C. Addition of water (2% by the volume of the mixture) followed and the mixture was sheared (Silverson LM-5A) for 2 min keeping the temperature at 80° C. Centrifugation followed for 15 min at 15000 g at 40° C. (Centrifuge 5804R, Eppendorf, VWR International GmbH, Switzerland). The upper 90% (v/v) degummed liquid phase (auxiliary degummed palm oil) was taken off for bleaching.

Washing of Bleaching Clay 3 g clay (w/w) was mixed with 97 g Milli-Q water, manually shaken, then centrifuged at 4500 g for 10 min and water removed, 3 times consecutively. The wet clay was then dried in an oven at 50° C. overnight.

Bleaching of Auxiliary Degummed Palm Oil

The auxiliary degummed palm oil was transferred into a round 0.25 L rotary evaporator flask heated at 85° C. in a water bath and 2% of previously washed and dried bleaching earth (Tonsil 112FF) was added. The flask was rotated at 240 rpm and temperature was increased and kept at 95° C. while vacuum was applied at 50 mbar for 20 min. Finally, the oil was filtered via a vacuum Millipore filtration apparatus using a Whatman filter 8 um.

Post-Bleaching Auxiliary Degumming of Bleached Palm Oil

Addition of Sunflower Gum to Palm Oil

Gum was obtained from sunflower oil as described above. Two volume equivalent quantity of sunflower gum was then added to bleached palm oil. In this case this corresponded to adding sunflower gum obtained from 80 mL sunflower oil to 40 mL bleached palm oil. The mixture was homogenized by shearing in a Silverson LM-5A for 4 min at 5000 rpm at 80° C. The mixture was homogenized by shearing in a Silverson LM-5A for 30 min at 5000 rpm at 80° C. and then heating at 165° C. for 1 h in a Thermo Scientific Heraeus oven (serie 6100). Note that this heat treatment does not yet induce formation of MCPD.

Water Acid Degumming and Washing of the Mixture of Sunflower Gum and Bleached Palm Oil The mixture containing the sunflower gum and the bleached palm oil was heated to 80° C. and phosphoric acid≥85% was then added in amount of 0.02% by volume. The mixture was then sheared (Silverson LM-5A) for 2 min at 5000 rpm at 80° C. Addition of water (2% by the volume of the mixture) followed and the mixture was sheared (Silverson LM-5A) for 2 min keeping the temperature at 80° C. Centrifugation followed for 15 min at 15000 g at 40° C. (Centrifuge 5804R, Eppendorf, VWR International GmbH, Switzerland). The upper 90% (v/v) degummed liquid phase was taken off for further washing. The mixture was heated to 80° C. and addition of water (2% by the volume of the mixture) followed and the mixture was sheared (Silverson LM-5A) for 2 min at 5000 rpm keeping the temperature at 80° C. Centrifugation followed for 15 min at 15000 g at 40° C. (Centrifuge 5804R, Eppendorf, VWR International GmbH, Switzerland). The upper 90% (v/v) was taken off for the last step of washing. The mixture was heated to 80° C. and addition of water (2% by the volume of the mixture) followed and the mixture was sheared (Silverson LM-5A) for 2 min at 5000 rpm keeping the temperature at 80° C. Centrifugation followed for 15 min at 15000 g at 40° C. (Centrifuge 5804R, Eppendorf, VWR International GmbH, Switzerland). The upper 90% (v/v) liquid phase (post-bleach auxiliary degummed palm oil) was taken off for drying, bleaching, ampoule heat-treatment and LC-MS analysis.

Drying of Oils

The oil was transferred into a round 0.5 L 0.2 L rotary evaporator flask heated at 85° C. in a water bath. The flask was rotated at 240 rpm and temperature was increased and kept at 95° C. while vacuum was applied at 15 mbar for 20 min.

Second Bleaching of the Twice Auxiliary Degummed Palm Oil

The post-bleach auxiliary degummed palm oil was transferred into a round 0.25 L rotary evaporator flask heated at 85° C. in a water bath and 2% of previously washed and dried bleaching earth (Tonsil 112FF) was added. The flask was rotated at 240 rpm and temperature was increased and kept at 95° C. while vacuum was applied at 50 mbar for 20 min. Finally, the oil was filtered via a vacuum Millipore filtration apparatus using a Whatman filter 8 um.

Figure 7:
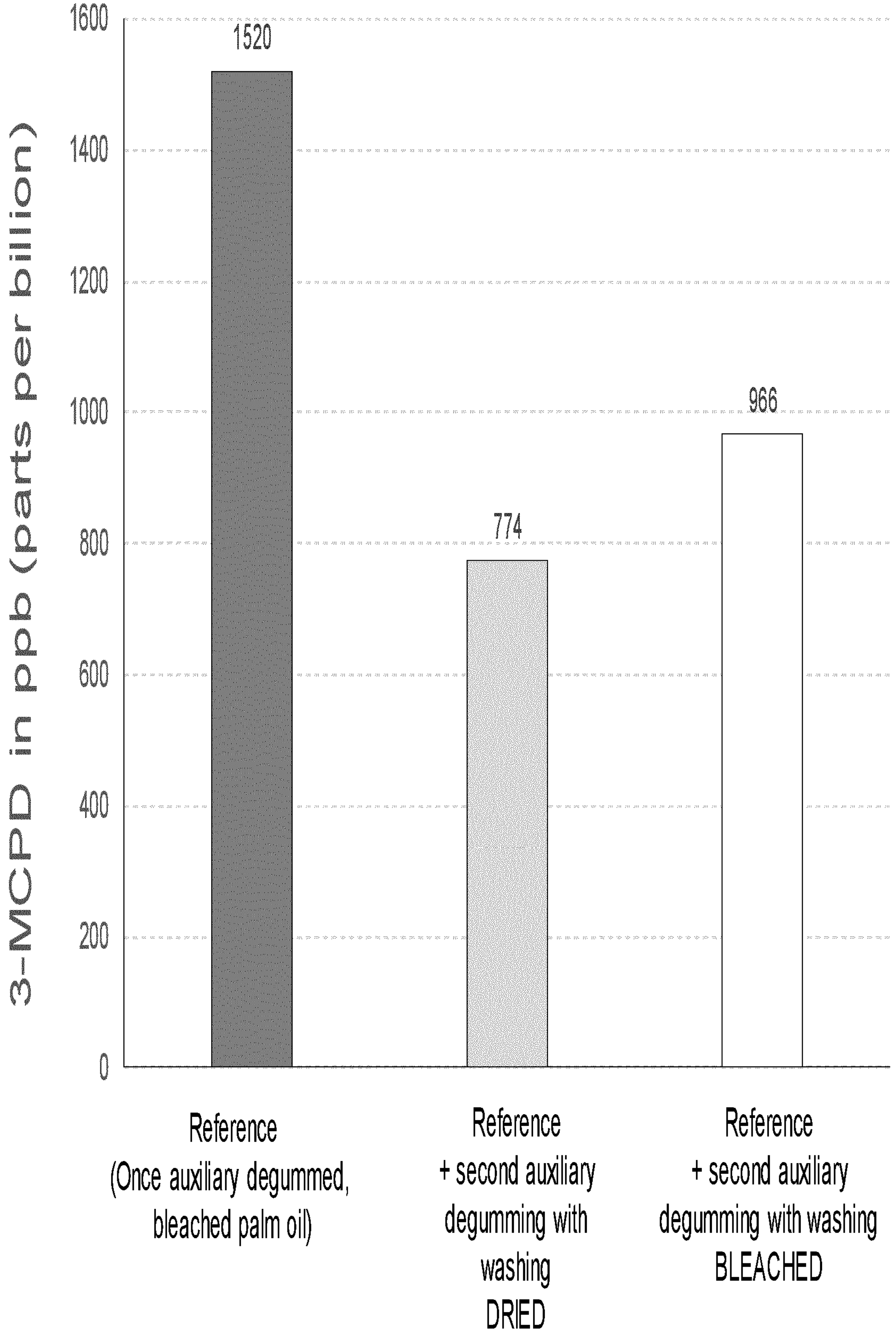
FIG. 7 shows the absolute 3-MCPD levels of once auxiliary degummed, bleached palm oil; twice auxiliary degummed, washed, and dried palm oil; and twice auxiliary degummed, washed, and bleached palm oil.

The absolute 3-MCPD levels were determined by Official AOCS Cd 29b-13 method at SGS laboratory. The results shown in FIG. 7 show that the application of second, post-bleaching auxiliary degumming together with drying, results in about 50% reduction in 3-MCPD corresponding in this case to about 0.7 ppm mitigation. The benefit is preserved although slightly less when the sample is subjected to a second, final bleaching process retaining about 30% reduction in 3-MCPD corresponding in this case to about 0.5 ppm mitigation—see the third column in FIG. 7.

Example 8

Benefit of Double Auxiliary Degumming Combined with Washing

Figure 16:
FIG. 16 shows the key steps of Example 8.

The key steps of this example are summarized in FIG. 16.

Industrially Produced Crude Palm Oil

Industrially produced crude palm oil was purchased from Nutriswiss (Lyss, Switzerland). The oil was subjected to centrifugation based pre-purification. 5 L of the industrial crude palm oil was equilibrated at 60° C. for 30 min in a water bath and then homogenized vigorously by manual shaking. 40 mL aliquots were transferred into 50 mL Falcon® tubes and were centrifuged at 15000 g for 15 min at 40° C. (Centrifuge 5804R, Eppendorf, VWR International GmbH, Switzerland). The sediment-free upper 80% v/v corresponding to 36 mL aliquots were taken from the of each Falcon® tube, were combined and used for further work.

Pressed Sunflower Oil

Sunflower seeds were pressed using a home electrical oil press (OP 700, Rommelsbacher, Germany) resulting in pressed oil and remaining solid residue (cake). The pressed oil was then filtered through filter paper (Whatman 595½).

Production of Gum from Sunflower Oil

Pressed crude sunflower oil was degummed by first heating the oils to 80° C. then adding 2% v/v of water. The mixture was sheared in a Silverson LM-5A mixer for 10 min at 1500 rpm at 80° C. The mixture was then transferred into 40 mL Falcon tubes and was centrifuged for 15 min at 15000 g at 40° C. (Centrifuge 5804R, Eppendorf, VWR International GmbH, Switzerland). The upper 95% v/v of the oil was taken off and the remaining lower phase including the precipitated gums at the bottom of the tubes was used as the "gum" for further work.

Water Degumming of Palm Oil

The oil was heated to 80° C. and water was added in amount of 2% by volume of the oil. The oil was then sheared (Silverson LM-5A) for 4 min at 1500 rpm at 80° C. Centrifugation followed for 15 min at 15000 g at 40° C. (Centrifuge 5804R, Eppendorf, VWR International GmbH, Switzerland). The upper 90% (v/v) degummed liquid phase was used for further work.

First Step Auxiliary Degumming

Addition of Sunflower Gum to Degummed Palm Oil

Gum was obtained from sunflower oil as described above. Two volume equivalent quantity of sunflower gum was then added to water degummed palm oil. In this case this corresponded to adding sunflower gum obtained from 80 mL sunflower oil to 40 mL water degummed palm oil. The mixture was homogenized by shearing in a Silverson LM-5A for 30 min at 5000 rpm at 80° C. and then heating at 165° C. for 1 h in a Thermo Scientific Heraeus oven (serie 6100). Note that this heat treatment does not yet induce formation of MCPD.

Degumming and Washing the Gum-Palm Oil Mixture

Following this heat treatment, the samples were cooled in a 40° C. water bath for 10 min and then subjected to centrifugation for 15 min at 15000 g at 40° C. (Centrifuge 5804R, Eppendorf, VWR International GmbH, Switzerland). The upper 90% (v/v) liquid phase (auxiliary degummed palm oil) was taken off for further work.

The above mixture was heated to 80° C. and phosphoric acid≥85% was then added in amount of 0.02% by volume. The mixture was then sheared (Silverson LM-5A) for 2 min at 5000 rpm at 80° C. Addition of water (2% by the volume of the mixture) followed and the mixture was sheared (Silverson LM-5A) for 2 min keeping the temperature at 80° C. Centrifugation followed for 15 min at 15000 g at 40° C. (Centrifuge 5804R, Eppendorf, VWR International GmbH, Switzerland). The upper 90% (v/v) degummed liquid phase was taken off for further washing. The mixture was heated to 80° C. and addition of water (2% by the volume of the mixture) followed and the mixture was sheared (Silverson LM-5A) for 2 min at 5000 rpm keeping the temperature at 80° C. Centrifugation followed for 15 min at 15000 g at 40° C. (Centrifuge 5804R, Eppendorf, VWR International GmbH, Switzerland). The upper 90% (v/v) was taken off for the last step of washing. The mixture was heated to 80° C. and addition of water (2% by the volume of the mixture) followed and the mixture was sheared (Silverson LM-5A) for 2 min at 5000 rpm keeping the temperature at 80° C. Centrifugation followed for 15 min at 15000 g at 40° C. (Centrifuge 5804R, Eppendorf, VWR International GmbH, Switzerland). The upper 90% (v/v) liquid phase (auxiliary degummed washed palm oil) was taken off for further work.

Washing of Bleaching Clay 3 g clay (w/w) was mixed with 97 g Milli-Q water, manually shaken, then centrifuged at 4500 g for 10 min and water removed, 3 times consecutively. The wet clay was then dried in an oven at 50° C. overnight.

Bleaching of Auxiliary Degummed Palm Oil

The auxiliary degummed palm oil was transferred into a round 0.25 L rotary evaporator flask heated at 85° C. in a water bath and 2% of previously washed and dried bleaching earth (Tonsil 112FF) was added. The flask was rotated at 240 rpm and temperature was increased and kept at 95° C. while vacuum was applied at 50 mbar for 20 min. Finally, the oil was filtered via a vacuum Millipore filtration apparatus using a Whatman filter 8 um.

Second, Post-Bleaching Auxiliary Degumming of Bleached Palm Oil

This step is a repetition of the previous auxiliary degumming and washing step but after the first bleaching.

Addition of Sunflower Gum to Palm Oil

Gum was obtained from sunflower oil as described above. Two volume equivalent quantity of sunflower gum was then added to bleached palm oil. In this case this corresponded to adding sunflower gum obtained from 80 mL sunflower oil to 40 mL bleached palm oil. The mixture was homogenized by shearing in a Silverson LM-5A for 4 min at 5000 rpm at 80° C. The mixture was homogenized by shearing in a Silverson LM-5A for 30 min at 5000 rpm at 80° C. and then heating at 165° C. for 1 h in a Thermo Scientific Heraeus oven (serie 6100). Note that this heat treatment does not yet induce formation of MCPD.

Water Acid Degumming and Washing of the Mixture of Sunflower Gum and Bleached Palm Oil The mixture containing the sunflower gum and the bleached palm oil was heated to 80° C. and phosphoric acid≥85% was then added in amount of 0.02% by volume. The mixture was then sheared (Silverson LM-5A) for 2 min at 5000 rpm at 80° C. Addition of water (2% by the volume of the mixture) followed and the mixture was sheared (Silverson LM-5A) for 2 min keeping the temperature at 80° C. Centrifugation followed for 15 min at 15000 g at 40° C. (Centrifuge 5804R, Eppendorf, VWR International GmbH, Switzerland). The upper 90% (v/v) degummed liquid phase was taken off for further washing. The mixture was heated to 80° C. and addition of water (2% by the volume of the mixture) followed and the mixture was sheared (Silverson LM-5A) for 2 min at 5000 rpm keeping the temperature at 80° C. Centrifugation followed for 15 min at 15000 g at 40° C. (Centrifuge 5804R, Eppendorf, VWR International GmbH, Switzerland). The upper 90% (v/v) was taken off for the list step of washing. The mixture was heated to 80° C. and addition of water (2% by the volume of the mixture) followed and the mixture was sheared (Silverson LM-5A) for 2 min at 5000 rpm keeping the temperature at 80° C. Centrifugation followed for 15 min at 15000 g at 40° C. (Centrifuge 5804R, Eppendorf, VWR International GmbH, Switzerland). The upper 90% (v/v) liquid phase (double auxiliary degummed and bleached palm oil) was taken off for drying, bleaching, ampoule heat-treatment and LC-MS analysis.

Drying of Oils

The oil was transferred into a round 0.5 L or 0.2 L rotary evaporator flask heated at 85° C. in a water bath. The flask was rotated at 240 rpm and temperature was increased and kept at 95° C. while vacuum was applied at 15 mbar for 20 min.

Second Bleaching of the Twice Auxiliary Degummed Palm Oil

The post-bleach auxiliary degummed palm oil was transferred into a round 0.25 L rotary evaporator flask heated at 85° C. in a water bath and 2% of previously washed and dried bleaching earth (Tonsil 112FF) was added. The flask was rotated at 240 rpm and temperature was increased and kept at 95° C. while vacuum was applied at 50 mbar for 20 min. Finally, the oil was filtered via a vacuum Millipore filtration apparatus using a Whatman filter 8 um.

Figure 8:
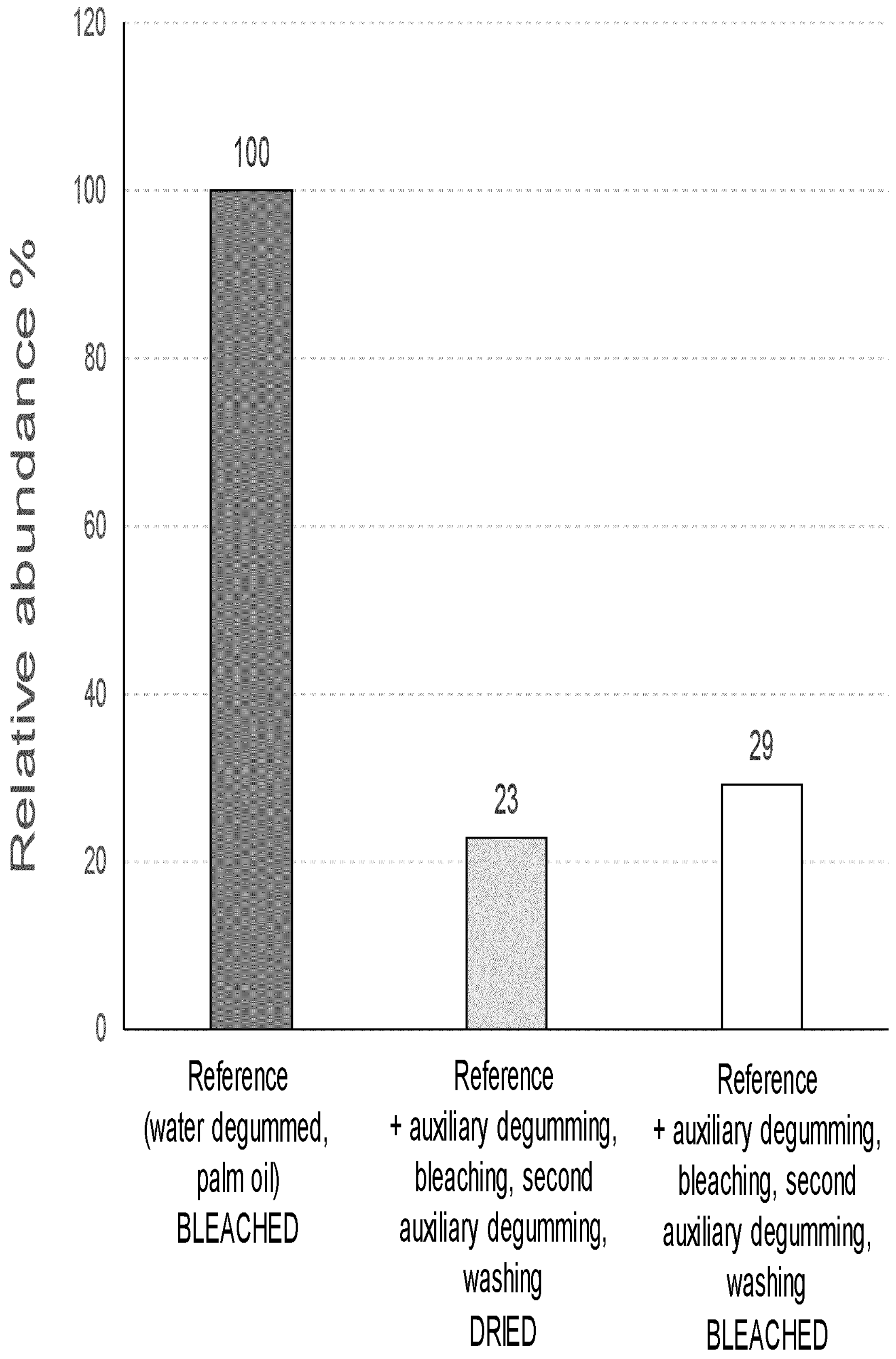
FIG. 8 shows the relative abundance % of Reference (water degummed, bleached palm oil); Reference with first auxiliary degumming, bleaching, the second auxiliary degumming, washing, and drying; and Reference with first auxiliary degumming, bleaching, the second auxiliary degumming, washing, and bleaching.

The MCPD diester levels observed in these dried, bleached, heat treated oils show that the application of two auxiliary degumming steps with a bleaching step in between results in about 77% reduction in 3-MCPD for dried samples (FIG. 8). This benefit is preserved although slightly less when the sample is subjected to a second, final bleaching process retaining about 71% reduction in 3-MCPD—see the third column in FIG. 8.

Figure 9:
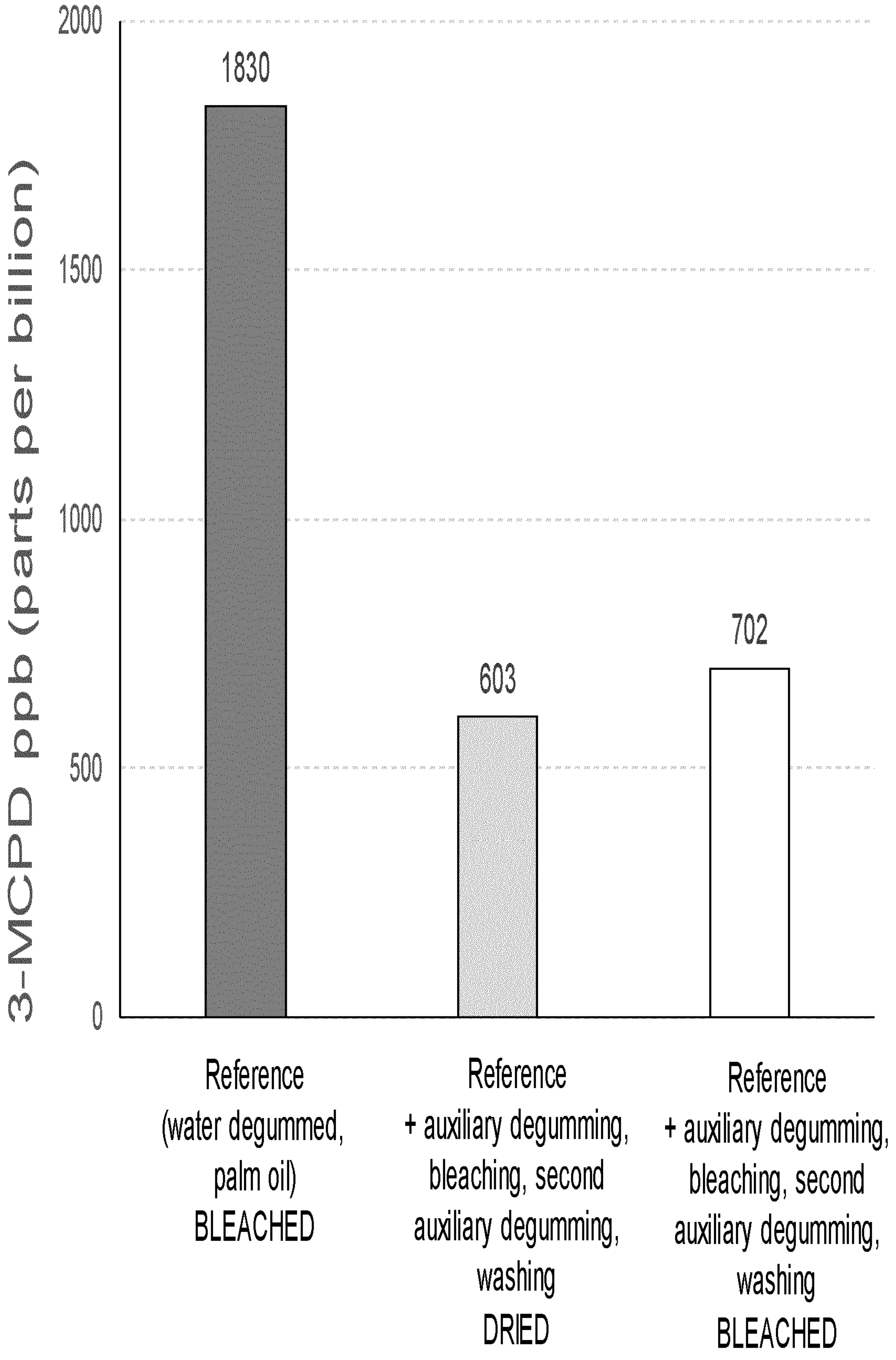
FIG. 9 shows the absolute 3-MCPD levels of Reference (water degummed, bleached palm oil); Reference with first auxiliary degumming, bleaching, second auxiliary degumming, washing, and drying; and Reference with first auxiliary degumming, bleaching, second auxiliary degumming, washing, and bleaching.

For the same samples, the absolute 3-MCPD levels were determined by Official AOCS Cd 29b-13 method at SGS laboratory. The results shown in FIG. 9 confirm that the application of second, post-bleaching auxiliary degumming together with drying, results in about 67% reduction in 3-MCPD corresponding in this case to about 1.2 ppm mitigation. The benefit is preserved although slightly less when the sample is subjected to a second, final bleaching process retaining about 61% reduction in 3-MCPD corresponding in this case to about 1.1 ppm mitigation—see the third column in FIG. 9.

Example 9

Benefit of Acid-Free Auxiliary Degumming Combined with Washing

Figure 17:
FIG. 17 shows the key steps of Example 9.

The key steps of this example are summarized in FIG. 17.

Industrially Produced Crude Palm Oil

Industrially produced crude palm oil was purchased from Nutriswiss (Lyss, Switzerland). The oil was subjected to centrifugation based pre-purification. 5 L of the industrial crude palm oil was equilibrated at 60° C. for 30 min in a water bath and then homogenized vigorously by manual shaking. 40 mL aliquots were transferred into 50 mL Falcon® tubes and were centrifuged at 15000 g for 15 min at 40° C. (Centrifuge 5804R, Eppendorf, VWR International GmbH, Switzerland). The sediment-free upper 80% v/v corresponding to 36 mL aliquots were taken from the of each Falcon® tube, were combined and used for further work.

Pressed Sunflower Oil

Sunflower seeds were pressed using a home electrical oil press (OP 700, Rommelsbacher, Germany) resulting in pressed oil and remaining solid residue (cake). The pressed oil was then filtered through filter paper (Whatman 595½).

Production of Gum from Sunflower Oil

Pressed crude sunflower oil was degummed by first heating the oils to 80° C. then adding 2% v/v of water. The mixture was sheared in a Silverson LM-5A mixer for 10 min at 1500 rpm at 80° C. The mixture was then transferred into 40 mL Falcon tubes and was centrifuged for 15 min at 15000 g at 40° C. (Centrifuge 5804R, Eppendorf, VWR International GmbH, Switzerland). The upper 95% v/v of the oil was taken off and the remaining lower phase including the precipitated gums at the bottom of the tubes was used as the "gum" for further work.

Water Degumming of Palm Oil

The oil was heated to 80° C. and water was added in amount of 2% by volume of the oil. The oil was then sheared (Silverson LM-5A) for 4 min at 1500 rpm at 80° C. Centrifugation followed for 15 min at 15000 g at 40° C. (Centrifuge 5804R, Eppendorf, VWR International GmbH, Switzerland). The upper 90% (v/v) degummed liquid phase was used for further work.

Auxiliary Degumming

Addition of Sunflower Gum to Degummed Palm Oil

Gum was obtained from sunflower oil as described above. Then 2 volume equivalent quantity of sunflower gum was added to water degummed palm oil. In this case this corresponded to adding sunflower gum obtained from 80 mL sunflower oil to 40 mL water degummed palm oil. The mixture was homogenized by shearing in a Silverson LM-5A for 30 min at 5000 rpm at 80° C. and then heating at 165° C. for 1 h in a Thermo Scientific Heraeus oven (serie 6100). Note that this heat treatment does not yet induce formation of MCPD.

Degumming and Washing the Gum-Palm Oil Mixture

Following this heat treatment, the samples were cooled in a 40° C. water bath for 10 min and then subjected to centrifugation for 15 min at 15000 g at 40° C. (Centrifuge 5804R, Eppendorf, VWR International GmbH, Switzerland). The upper 90% (v/v) liquid phase (auxiliary degummed palm oil) was taken off for further work.

The mixture was heated to 80° C. and addition of water (2% by the volume of the mixture) followed and the mixture was sheared (Silverson LM-5A) for 2 min at 5000 rpm keeping the temperature at 80° C. Centrifugation followed for 15 min at 15000 g at 40° C. (Centrifuge 5804R, Eppendorf, VWR International GmbH, Switzerland). The upper 90% (v/v) was taken off for further work and this washing process was repeated two more times.

Drying of Oils

The oil was transferred into a round 0.5 L or 0.2 L rotary evaporator flask heated at 85° C. in a water bath. The flask was rotated at 240 rpm and temperature was increased and kept at 95° C. while vacuum was applied at 15 mbar for 20 min.

Washing of Bleaching Clay 3 g clay (w/w) was mixed with 97 g Milli-Q water, manually shaken, then centrifuged at 4500 g for 10 min and water removed, 3 times consecutively. The wet clay was then dried in an oven at 50° C. overnight.

Bleaching of Degummed Palm Oil

The auxiliary degummed palm oil was transferred into a round 0.25 L rotary evaporator flask heated at 85° C. in a water bath and 2% of previously washed and dried bleaching earth (Tonsil 112FF) was added. The flask was rotated at 240 rpm and temperature was increased and kept at 95° C. while vacuum was applied at 50 mbar for 20 min. Finally, the oil was filtered via a vacuum Millipore filtration apparatus using a Whatman filter 8 um.

Figure 10:
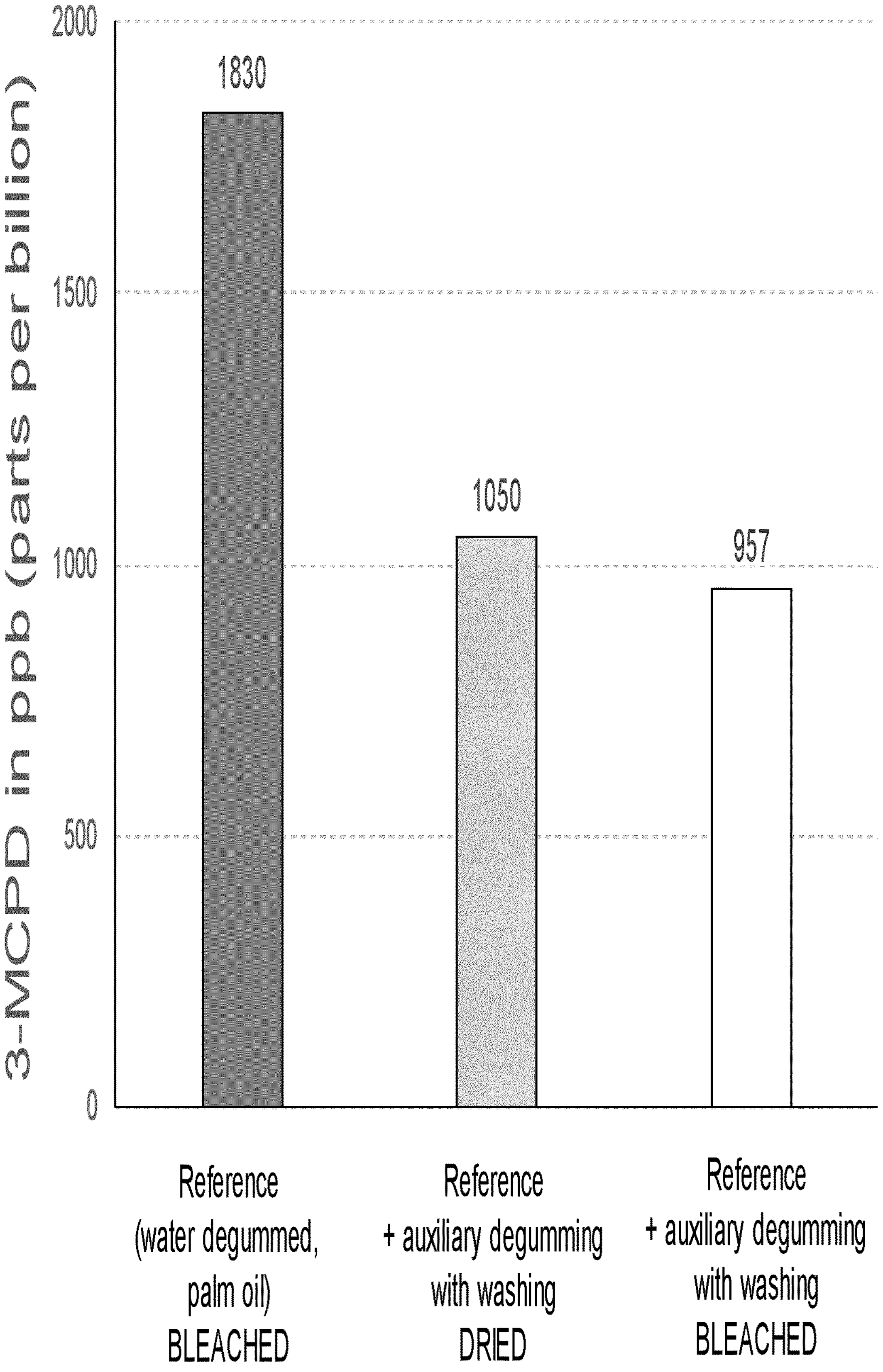
FIG. 10 shows the absolute 3-MCPD levels of Reference (water degummed, bleached palm oil); Reference with auxiliary degumming, washing, and drying; and Reference with auxiliary degumming, washing, and bleaching.

The absolute 3-MCPD levels were determined by Official AOCS Cd 29b-13 method at SGS laboratory. The results shown in FIG. 10 confirm that the application of acid-free auxiliary degumming together with drying, results in about 42% reduction in 3-MCPD corresponding in this case to about 0.7 ppm mitigation. The benefit is preserved when the sample is subjected to a bleaching process retaining about 47% reduction in 3-MCPD corresponding in this case to about 0.8 ppm mitigation—see the third column in FIG. 10.

Example 10

Auxiliary Settling in Crude Fish Oil

Industrially Produced Crude Fish Oil

Industrially produced crude fish oil was obtained from Sofinol S.A. (Manno, Switzerland).

Pressed Sunflower Oil

Sunflower seeds were pressed using a home electrical oil press (OP 700, Rommelsbacher, Germany) resulting in pressed oil and remaining solid residue (cake). The pressed oil was then filtered through filter paper (Whatman 595½) at 65° C. in an oven.

Production of Sedimented Gum from Sunflower Oil

Pressed crude sunflower oil was left at room temperature for 4 weeks to develop a sediment layer at the bottom of the storage bottle. The upper 90% of the oil was taken off and the lower, sediment-rich 10% was used for further work as "sedimented sunflower gum". Directly before usage, the sedimented sunflower gum was heated to 165° C. for 30 min in a Thermo Scientific Heraeus oven (serie 6100) then cooled down in a 40° C. water bath for 15 min.

Auxiliary Settling of Crude Fish Oil with Sedimented Sunflower Gum 9 mL aliquots of crude fish oil were mixed with 1 mL of heat-treated sedimented sunflower gum. The mixture was heated to 80° C. for 15 min in a water bath and shaken manually. Then the mixture was stored at room temperature for 3 weeks.

Following this storage, the mixture was equilibrated at 45° C. for 15 min in a water bath, then centrifuged for 15 min at 15000 g at 40° C. (Centrifuge 5804R, Eppendorf, VWR International GmbH, Switzerland). The upper 10% (v/v), middle 80% and the lower 10% (v/v) were taken for heat treatment and subsequent MCPD analysis.

Figure 11:
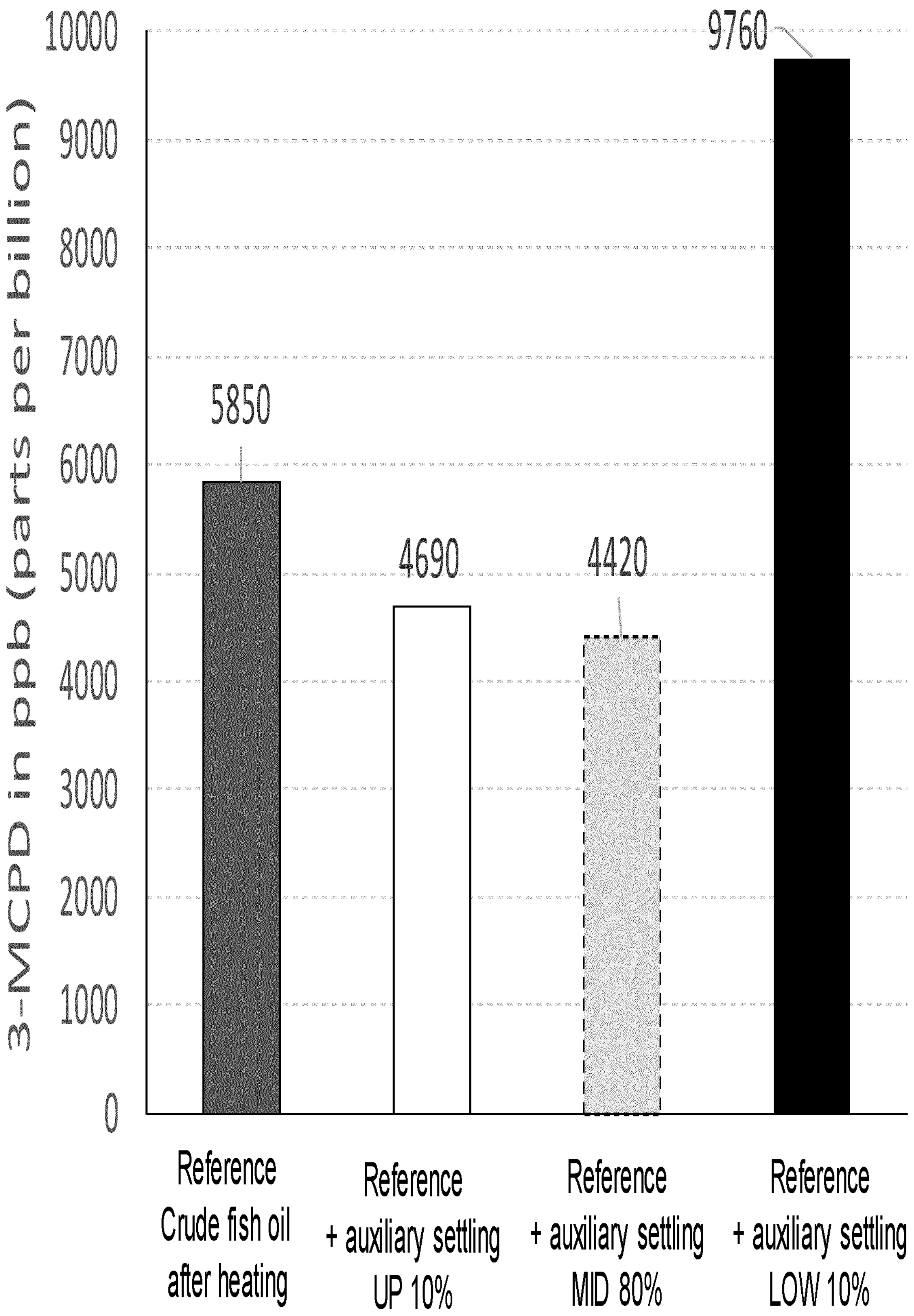
FIG. 11 shows the absolute 3-MCPD levels of Reference (crude fish oil after heating); and Reference with auxiliary settling in the upper 10% (v/v), middle 80% (v/v) and the lower 10% (v/v) fractions in Example 10.

The absolute 3-MCPD levels were determined by Official AOCS Cd 29b-13 method at SGS laboratory. The results shown in FIG. 11 confirm that the low 10% phase develops more than 2 times more 3-MCPD than the rest of the oil, hereby accumulating MCPD precursors in the low phase. This is complemented by the results of the upper 10% and middle 80% of the oil showing about 1 ppm lower 3-MCPD levels compared to the original starting oil.

Example 11

Accelerated Auxiliary Settling of Crude Fish Oil

Industrially Produced Crude Fish Oil

Industrially produced crude fish oil was obtained from Sofinol S.A. (Manno, Switzerland).

Pressed Sunflower Oil

Sunflower seeds were pressed using a home electrical oil press (OP 700, Rommelsbacher, Germany) resulting in pressed oil and remaining solid residue (cake). The pressed oil was then filtered through filter paper (Whatman 595½) at 65° C. in an oven.

Production of Sedimented Gum from Sunflower Oil

Pressed crude sunflower oil was left at room temperature for 4 weeks to develop a sediment layer at the bottom of the storage bottle. The upper 90% of the oil was taken off and the lower, sediment-rich 10% was used for further work as "sedimented sunflower gum". Directly before usage, the sedimented sunflower gum was heated to 165° C. for 30 min in a Thermo Scientific Heraeus oven (serie 6100) then cooled down in a 40° C. water bath for 15 min.

Accelerated Auxiliary Settling of Crude Fish Oil with Sedimented Sunflower Gum 9 mL aliquots of crude fish oil were mixed with 1 mL of heat-treated sedimented sunflower gum. The mixture was heated to 80° C. for 15 min in a water bath and shaken manually. Then the mixture was stored at 6° C. temperature for 1 week.

Following this storage, the mixture was equilibrated at 45° C. for 15 min in a water bath, then centrifuged for 15 min at 15000 g at 40° C. (Centrifuge 5804R, Eppendorf, VWR International GmbH, Switzerland). The upper 10% (v/v), middle 80% and the lower 10% (v/v) were taken for heat treatment and subsequent MCPD analysis.

Figure 12:
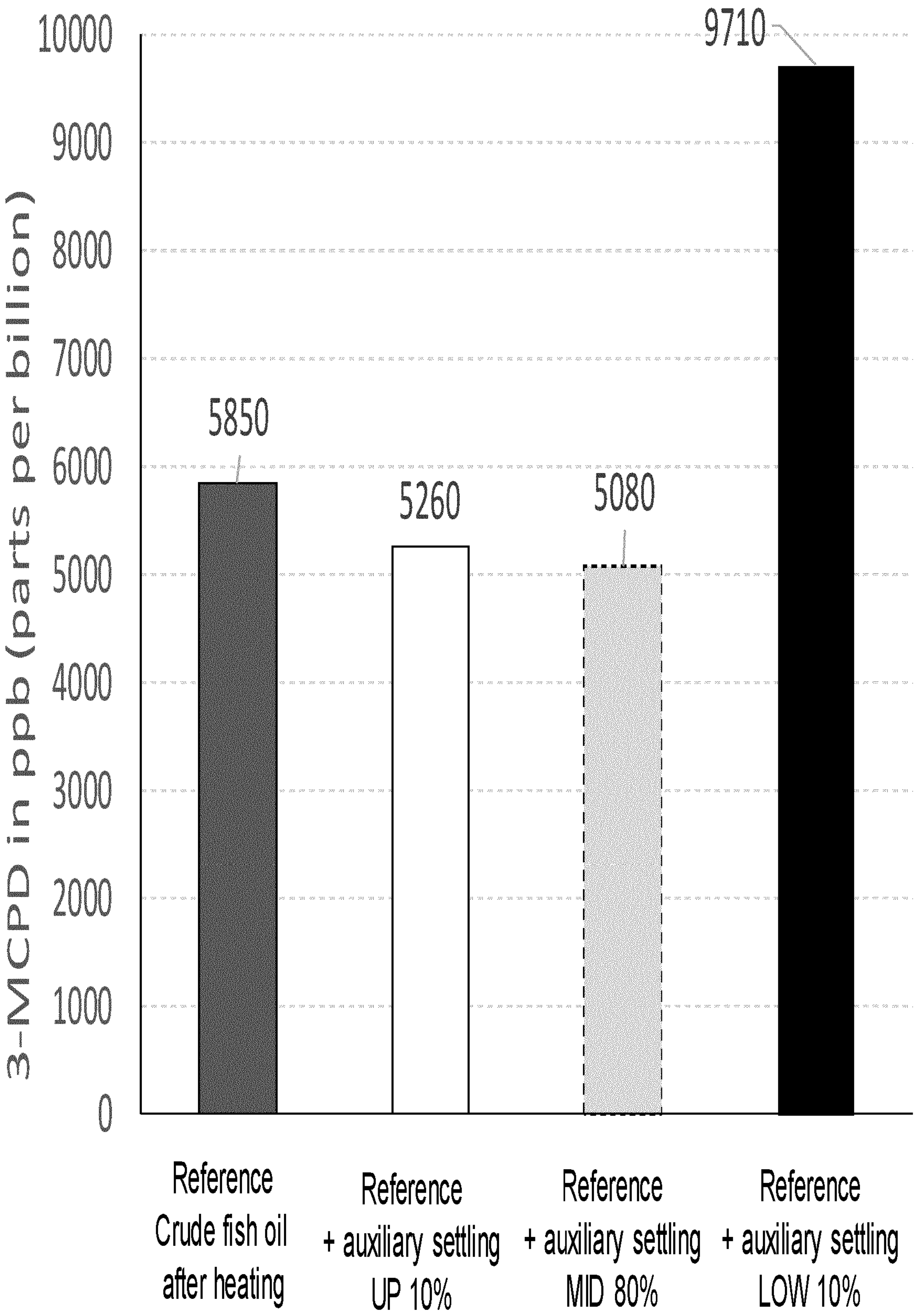
FIG. 12 shows the absolute 3-MCPD levels of Reference (crude fish oil after heating); and Reference with auxiliary settling in the upper 10% (v/v), middle 80% (v/v) and the lower 10% (v/v) fractions in Example 11.

The absolute 3-MCPD levels were determined by Official AOCS Cd 29b-13 method at SGS laboratory. The results shown in FIG. 12 confirm that the low 10% phase develops about 2 times more 3-MCPD than the rest of the oil, hereby accumulating MCPD precursors in the low phase.

Description of ampoule heating and analytical procedures can be found as previously described above.

Example 12

Benefit of Two-Steps of Auxiliary Degumming on Dried Oils

Figure 18:
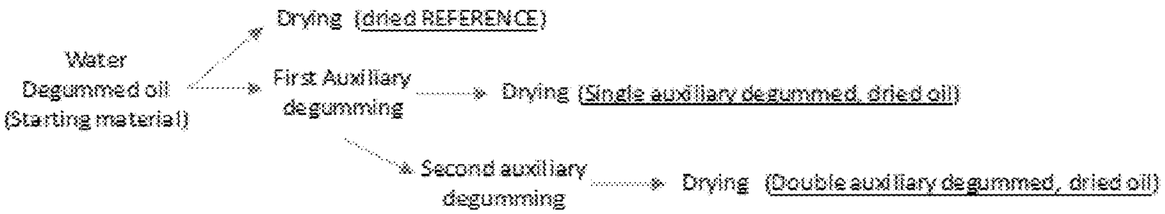
FIG. 18 shows the key steps of Example 12.

The key steps of this example are summarized in in FIG. 18.

Industrially Produced Crude Palm Oil

Industrially produced crude palm oil was purchased from Nutriswiss (Lyss, Switzerland). The oil was subjected to centrifugation based pre-purification. 5 L of the industrial crude palm oil was equilibrated at 60° C. for 30 min in a water bath and then homogenized vigorously by manual shaking. 40 mL aliquots were transferred into 50 mL Falcon® tubes and were centrifuged at 15000 g for 15 min at 40° C. (Centrifuge 5804R, Eppendorf, VWR International GmbH, Switzerland). The sediment-free upper 90% v/v corresponding to 36 mL aliquots were taken from each Falcon® tube, were combined and used for further work.

Pressed Sunflower Oil

Sunflower seeds were pressed using a home electrical oil press (OP 700, Rommelsbacher, Germany) resulting in pressed oil and remaining solid residue (cake). The pressed oil was then filtered through filter paper (Whatman 595½) at room temperature.

Production of Gum from Sunflower Oil

Pressed crude sunflower oil was degummed by first adding 2% v/v of water at room temperature. The mixture was sheared with a Silverson LM-5A mixer for 10 min at 1500 rpm at room temperature. The mixture was then transferred into 40 mL Falcon tubes, left for 30 min at room temperature and then was centrifuged for 15 min at 15000 g at room temperature (Centrifuge 5804R, Eppendorf, VWR International GmbH, Switzerland). The upper 90% v/v of the oil was taken off and the remaining lower phase including the precipitated gums at the bottom of the tubes was used as the "gum" for further work.

Water Degumming of Palm Oil

The oil was heated to 80° C. and 2% v/v of water heated to 80° C. was then added. The oil was then sheared (Silverson LM-5A) for 4 min at 1500 rpm at 80° C. Centrifugation followed for 15 min at 15000 g at 40° C. (Centrifuge 5804R, Eppendorf, VWR International GmbH, Switzerland). The upper 90% (v/v) degummed liquid phase was used for further work.

Auxiliary Degumming Including a One Step Water Washing

Gum was obtained from sunflower oil as described above. Then 2 volume equivalent quantity of sunflower gum was added to water degummed palm oil. In this case this corresponded to adding sunflower gum obtained from 80 mL sunflower oil to 40 mL degummed palm oil. The mixture was homogenized by shearing in a Silverson LM-5A for 30 min at 5000 rpm at 80° C. and then heated in closed glass vessel at 165° C. for 1 h in a Thermo Scientific Heraeus oven (series 6100) with 10 sec manual shaking at every 10 min intervals. Note that this heat treatment does not yet induce formation of MCPD.

Following heating, the mixture was cooled down by keeping it at room temperature for 5 min, then putting it into a room temperature water bath for 10 min. Then the mixture was equilibrated at 40° C. for 10 min and centrifuged for 15 min at 15000 g at 40° C. (Centrifuge 5804R, Eppendorf, VWR International GmbH, Switzerland). The upper 90% (v/v) degummed liquid phase was taken off and used for further work.

In the next step 2% v/v of water was added to the above upper 90% of degummed liquid phase. The mixture was then sheared (Silverson LM-5A) for 4 min at 5000 rpm at 80° C. and equilibrated at 40° C. for 10 min. Centrifugation followed for 15 min at 15000 g at 40° C. (Centrifuge 5804R, Eppendorf, VWR International GmbH, Switzerland). The upper 90% (v/v) degummed/washed liquid phase (auxiliary degummed palm oil) was taken off for further work.

Drying of Oils

The oil was transferred into a round 0.2 L rotary evaporator flask heated at 95° C. in a water bath. The flask was rotated at 240 rpm and vacuum was applied at 20 mbar for 20 min.

Figure 13:
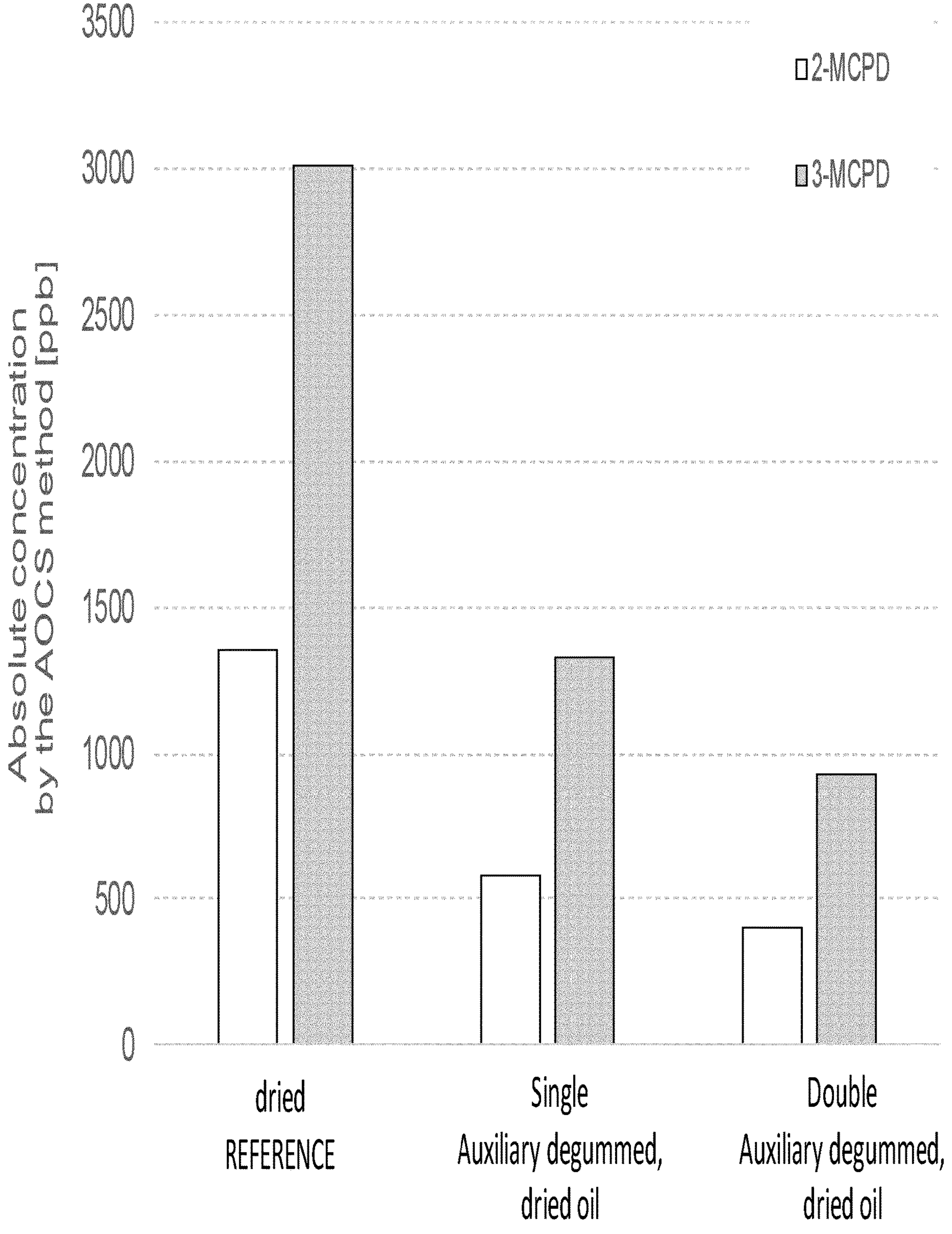
FIG. 13 shows the absolute 2-MCPD and 3-MCPD levels of samples shown in FIG. 18, dried Reference; single auxiliary degummed, dried oil; and double auxiliary degummed, dried oil.

The resulting samples according to FIG. 18 were subjected to analysis by the Official AOCS Cd 29b-13 method at SGS laboratory. The results shown in FIG. 13 confirm that the application of auxiliary degumming without any bleaching process results in about 55% reduction in 3-MCPD in dried oils corresponding in this case to about 1.7 ppm mitigation. Even bigger benefit is observed when auxiliary degumming is repeated leading to 0.93 ppm final concentration of 3-MCPD—see the "Double (Auxiliary degummed/dried) oil" columns in FIG. 13.

Example 13

Benefit of Single and Double Auxiliary Degumming in Combination with Bleaching

Figure 19:
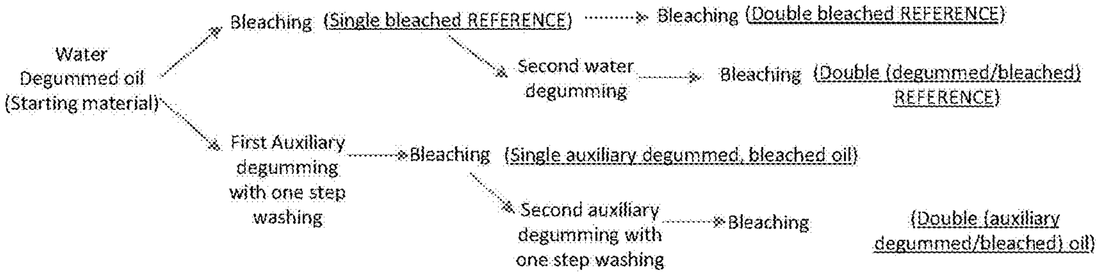
FIG. 19 shows the key steps of Example 13.

The key steps of this example are summarized in FIG. 19.

Industrially Produced Crude Palm Oil

Industrially produced crude palm oil was purchased from Nutriswiss (Lyss, Switzerland). The oil was subjected to centrifugation based pre-purification. 5 L of the industrial crude palm oil was equilibrated at 60° C. for 30 min in a water bath and then homogenized vigorously by manual shaking. 40 mL aliquots were transferred into 50 mL Falcon® tubes and were centrifuged at 15000 g for 15 min at 40° C. (Centrifuge 5804R, Eppendorf, VWR International GmbH, Switzerland). The sediment-free upper 90% v/v corresponding to 36 mL aliquots were taken from each Falcon® tube, were combined and used for further work.

Pressed Sunflower Oil

Sunflower seeds were pressed using a home electrical oil press (OP 700, Rommelsbacher, Germany) resulting in pressed oil and remaining solid residue (cake). The pressed oil was then filtered through filter paper (Whatman 595½) at room temperature.

Production of Gum from Sunflower Oil

Pressed crude sunflower oil was degummed by first adding 2% v/v of water at room temperature. The mixture was sheared with a Silverson LM-5A mixer for 10 min at 1500 rpm at room temperature. The mixture was then transferred into 40 mL Falcon tubes, left for 30 min at room temperature and then was centrifuged for 15 min at 15000 g at room temperature (Centrifuge 5804R, Eppendorf, VWR International GmbH, Switzerland). The upper 90% v/v of the oil was taken off and the remaining lower phase including the precipitated gums at the bottom of the tubes was used as the "gum" for further work.

Water Degumming of Palm Oil

The oil was heated to 80° C. and 2% v/v of water heated to 80° C. was then added. The oil was then sheared (Silverson LM-5A) for 4 min at 1500 rpm at 80° C. Centrifugation followed for 15 min at 15000 g at 40° C. (Centrifuge 5804R, Eppendorf, VWR International GmbH, Switzerland). The upper 90% (v/v) degummed liquid phase was used for further work.

Auxiliary Degumming Including a One Step Water Washing

Gum was obtained from sunflower oil as described above. Then 2 volume equivalent quantity of sunflower gum was added to water degummed palm oil. In this case this corresponded to adding sunflower gum obtained from 80 mL sunflower oil to 40 mL degummed palm oil. The mixture was homogenized by shearing in a Silverson LM-5A for 30 min at 5000 rpm at 80° C. and then heated in closed glass vessel at 165° C. for 1 h in a Thermo Scientific Heraeus oven (series 6100) with 10 sec manual shaking at every 10 min internals. Note that this heat treatment does not yet induce formation of MCPD.

Following heating, the mixture was cooled down by keeping it at room temperature for 5 min, then putting it into a room temperature water bath for 10 min. Then the mixture was equilibrated at 40° C. for 10 min and centrifuged for 15 min at 15000 g at 40° C. (Centrifuge 5804R, Eppendorf, VWR International GmbH, Switzerland). The upper 90% (v/v) degummed liquid phase was taken off and used for further work.

In the next step 2% v/v of water was added to the above upper 90% of degummed liquid phase. The mixture was then sheared (Silverson LM-5A) for 4 min at 5000 rpm at 80° C. and equilibrated at 40° C. for 10 min. Centrifugation followed for 15 min at 15000 g at 40° C. (Centrifuge 5804R, Eppendorf, VWR International GmbH, Switzerland). The upper 90% (v/v) degummed/washed liquid phase (auxiliary degummed palm oil) was taken off for further work.

Drying of Oils

The oil was transferred into a round 0.2 L rotary evaporator flask heated at 95° C. in a water bath. The flask was rotated at 240 rpm and vacuum was applied at 20 mbar for 20 min.

Washing of Bleaching Clay 3 g clay (w/w) was mixed with 97 g Milli-Q water, manually shaken, then centrifuged at 4500 g for 10 min and water removed by pipetting, 3 times consecutively. The wet clay was then dried in an oven at 50° C. for 24 h.

Bleaching of Auxiliary Degummed Palm Oil

The auxiliary degummed palm oil was transferred into a round 0.2 L rotary evaporator flask heated at 95° C. in a water bath and 2% w/w of previously washed and dried bleaching earth (Tonsil 112FF) was added. The flask was rotated at 240 rpm and vacuum was applied at 50 mbar for 20 min. Finally, the oil was filtered via a vacuum Millipore filtration apparatus using a Whatman filter 8 um.

Figure 14:
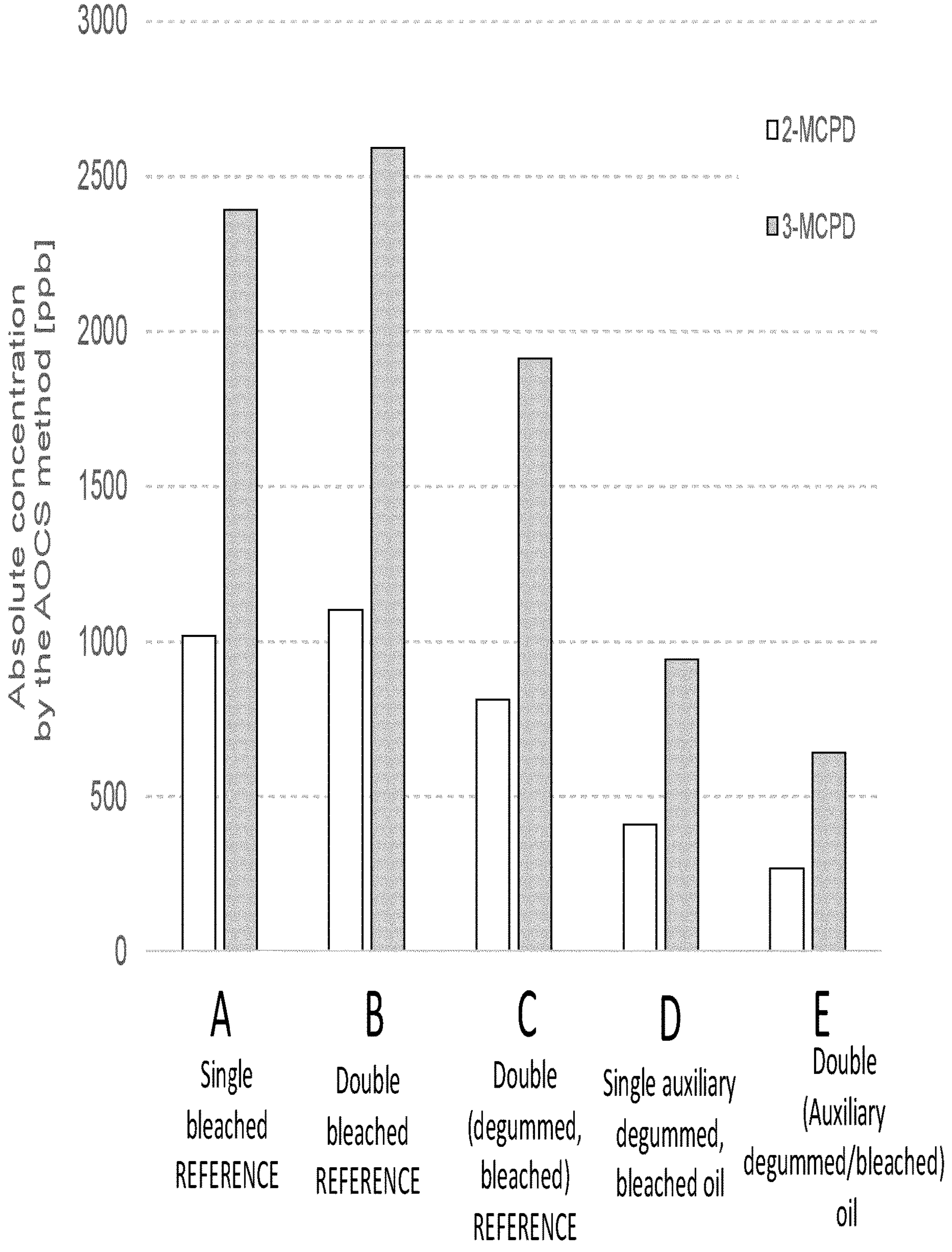
FIG. 14 shows the absolute 2-MCPD and 3-MCPD levels of samples shown in FIG. 19, single bleached Reference (A), double bleached Reference (B), Double (degummed, bleached) Reference (C), single auxiliary degummed, bleached oil (D), and double (auxiliary degummed/bleached) oil (E).

The resulting samples according to FIG. 19 were subjected to analysis by the Official AOCS Cd 29b-13 method at SGS laboratory. The results shown in FIG. 14 confirm that the application of auxiliary degumming in combination with bleaching process results in about 60% reduction in 3-MCPD corresponding in this case to about 1.4 ppm mitigation, see column A versus column D. The biggest benefit is observed when auxiliary degumming and bleaching are repeated consecutively leading to 0.64 ppm final concentration of 3-MCPD—see the "Double (Auxiliary degummed/bleached) oil" column E in FIG. 14. This latter corresponds to about 73% mitigation, see column A versus E.

All publications mentioned in the above specification are herein incorporated by reference. Various modifications and variations of the disclosed methods, uses and products of the invention will be apparent to the skilled person without departing from the scope and spirit of the invention. Although the invention has been disclosed in connection with specific preferred embodiments, it should be understood that the invention as claimed should not be unduly limited to such specific embodiments. Indeed, various modifications of the disclosed modes for carrying out the invention, which are obvious to the skilled person are intended to be within the scope of the following claims.

The invention claimed is:

1. A method for preventing or reducing the formation of monochloropropanediols (MCPDs) or monochloropropanediol esters (MCPDEs) in a triacylglyceride oil, comprising the steps:

(a) admixing the triacylglyceride oil with 1. an auxiliary triacylglyceride oil wherein the auxiliary triacylglyceride oil has higher phospholipid and/or wax content than the triacylglyceride oil; and/or
2. a gum extract;

(b) degumming the triacylglyceride oil admixture and/or optionally allowing insoluble components to crystallize;

(c) separating insoluble and crystallized components from the triacylglyceride oil admixture and/or applying one or more processes selected from the group consisting of degumming, physical refining, chemical refining, neutralization, interesterification, bleaching, dewaxing and fractionation; and (d) applying heat treatment to the triacylglyceride oil admixture.

2. The method of claim 1, wherein the triacylglyceride oil is selected from the group consisting of a plant oil, animal oil, fish oil, yeast oil, and fungi or algal oil.

3. The method of claim 1, wherein the triacylglyceride oil is palm oil or fractions obtained from palm oil.

4. The method of claim 1, wherein the triacylglyceride oil is fish oil or fractions obtained from fish oil.

5. The method of claim 1, wherein the triacylglyceride oil is a crude oil.

6. The method of claim 1, wherein the insoluble and crystallized components are separated from the triacylglyceride oil admixture by one or more of filtration, decantation, centrifugation, pumping, and draining.

7. The method of claim 1, wherein the gum extract is obtained by one or more of sedimentation, crystallization and settling, and centrifugation.

8. The method of claim 1, wherein the gum extract is obtained by one or more of water degumming, and acid degumming.

9. The method of claim 1, wherein the triacylglyceride oil is crude palm oil and the gum extract of step (a2) is gum extract obtained from sunflower oil.

10. The method of claim 1, wherein the triacylglyceride oil of step (a) is a triacylglyceride oil mixed with water and/or an acid, base or salt.

11. The method of claim 1, wherein the auxiliary oil of step (a1) is selected from the group consisting of sunflower oil, corn oil, canola oil, soybean oil and their high oleic variants.

12. The method of claim 1, wherein the gum extract of step (a2) is obtained from the group consisting of sunflower oil, corn oil, canola oil, soybean oil, rapeseed oil and their high oleic variants.

13. The method of claim 1, wherein the triacylglyceride oil has been degummed and/or neutralized and/or bleached before admixing.

14. The method of claim 1, wherein the triacylglyceride oil has a crystallized triacylglycerol content less than 10% (w/w %) before admixing.

15. The method of claim 1, wherein the triacylglyceride oil is devoid of added ionic, cationic and anionic surfactants and/or additives before admixing.

16. The method of claim 1, wherein the triacylglyceride oil is a plant oil.

* * * * *